US011940114B2

(12) United States Patent
Takagi et al.

(10) Patent No.: US 11,940,114 B2
(45) Date of Patent: Mar. 26, 2024

(54) LIGHT GUIDE PLATE, VEHICLE LAMP

(71) Applicant: OMRON Corporation, Kyoto (JP)

(72) Inventors: Yoshihiko Takagi, Kyoto (JP);
Masayuki Shinohara, Nagaokakyo (JP); Yasuhiro Tanoue, Kyoto (JP); Gouo Kurata, Kawanishi (JP); Norikazu Kitamura, Osaka (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/963,001

(22) PCT Filed: Jan. 23, 2019

(86) PCT No.: PCT/JP2019/002097
§ 371 (c)(1),
(2) Date: Jul. 17, 2020

(87) PCT Pub. No.: WO2019/159622
PCT Pub. Date: Aug. 22, 2019

(65) Prior Publication Data
US 2020/0371377 A1 Nov. 26, 2020

(30) Foreign Application Priority Data

Feb. 14, 2018 (JP) ................................. 2018-024359

(51) Int. Cl.
*F21S 43/14* (2018.01)
*B60Q 1/00* (2006.01)
(Continued)

(52) U.S. Cl.
CPC ............ *F21S 43/14* (2018.01); *B60Q 1/0023* (2013.01); *F21S 43/239* (2018.01); *F21S 43/245* (2018.01);
(Continued)

(58) Field of Classification Search
CPC ...... G02B 30/33; G02B 6/0036; F21S 43/249; F21S 43/239; F21S 43/245; F21S 43/14; B60Q 1/0023
See application file for complete search history.

(56) References Cited

U.S. PATENT DOCUMENTS

| | | | |
|---|---|---|---|
| 6,509,832 B1* | 1/2003 | Bauer | B63B 45/00 340/425.5 |
| 7,024,809 B1* | 4/2006 | Poma | G02B 6/006 264/400 |

(Continued)

FOREIGN PATENT DOCUMENTS

| | | |
|---|---|---|
| CN | 107111977 A | 8/2017 |
| DE | 112015005932 T5 | 10/2017 |

(Continued)

OTHER PUBLICATIONS

An English translation of the International Search Report ("ISR") of PCT/JP2019/002097 dated Mar. 12, 2019.

(Continued)

*Primary Examiner* — Christopher E Dunay
(74) *Attorney, Agent, or Firm* — METROLEX IP LAW GROUP, PLLC

(57) ABSTRACT

An optical device includes: a light guide plate having a group of optical-path deflectors configured to change the optical path of light from a first light source to form an image in the space within a first angle range, and change the optical path of light from a second light source to form an image in the space within a second angle range, wherein the first angle range and the second angle range are separated from each other or adjoining each other.

15 Claims, 26 Drawing Sheets

(51) Int. Cl.
*F21S 43/239* (2018.01)
*F21S 43/245* (2018.01)
*F21S 43/249* (2018.01)
*F21V 8/00* (2006.01)
*G02B 30/33* (2020.01)
*B60Q 1/34* (2006.01)
*F21Y 115/10* (2016.01)

(52) U.S. Cl.
CPC .......... *F21S 43/249* (2018.01); *G02B 6/0036* (2013.01); *G02B 30/33* (2020.01); *B60Q 1/34* (2013.01); *F21Y 2115/10* (2016.08)

(56) References Cited

U.S. PATENT DOCUMENTS

| | | | | |
|---|---|---|---|---|
| 2007/0198189 | A1* | 8/2007 | Herbin | G06K 9/00805 |
| | | | | 701/300 |
| 2014/0268327 | A1 | 9/2014 | Dunn et al. | |
| 2014/0293759 | A1* | 10/2014 | Taff | G03H 1/2294 |
| | | | | 368/239 |
| 2015/0131316 | A1* | 5/2015 | Takagi | G02B 6/006 |
| | | | | 362/609 |
| 2015/0168627 | A1* | 6/2015 | Takagi | G02B 6/0068 |
| | | | | 362/613 |
| 2015/0355403 | A1* | 12/2015 | Santori | G02B 6/0058 |
| | | | | 362/606 |
| 2017/0371088 | A1 | 12/2017 | Kitamura et al. | |
| 2018/0079359 | A1* | 3/2018 | Park | G01S 13/931 |
| 2019/0137772 | A1 | 5/2019 | Takagi et al. | |

FOREIGN PATENT DOCUMENTS

| | | |
|---|---|---|
| JP | 2012-118378 A | 6/2012 |
| JP | 2015-94833 A | 5/2015 |
| JP | 2016-130835 A | 7/2016 |
| JP | 2018-10223 A | 1/2018 |
| JP | 2018-13553 A | 1/2018 |

OTHER PUBLICATIONS

The Written Opinion("WO") of PCT/JP2019/002097 dated Mar. 12, 2019.
The International Preliminary Report on Patentability ("IPRP") dated Aug. 7, 2019.
The Office Action (CNOA) dated Aug. 3, 2021 in a counterpart Chinese patent application.
The Office Action dated Mar. 17, 2023 in a counterpart German patent application, with English translation.

* cited by examiner

FIG. 12A

| n | φ | x | θ | L |
|---|---|---|---|---|
| 1.585 | 50 | 84 | 40 | 85.33705 |
| | | 84 | 30 | 60.9248 |
| | | 84 | 20 | 38.80481 |
| | | 84 | 10 | 18.97332 |
| | | 50 | 40 | 49.61911 |
| | | 50 | 30 | 35.70692 |
| | | 50 | 20 | 23.02028 |
| | | 50 | 10 | 11.26494 |
| | | 30 | 40 | 29.54695 |
| | | 30 | 30 | 21.27168 |
| | | 30 | 20 | 13.71909 |
| | | 30 | 10 | 6.714724 |

FIG. 12B

| n | φ | x | θ | L |
|---|---|---|---|---|
| 1.49 | 50 | 84 | 40 | 90.5321 |
| | | 84 | 30 | 64.41627 |
| | | 84 | 20 | 41.44133 |
| | | 84 | 10 | 20.06686 |
| | | 50 | 40 | 54.39522 |
| | | 50 | 30 | 38.63256 |
| | | 50 | 20 | 24.67819 |
| | | 50 | 10 | 12.01144 |
| | | 30 | 40 | 32.67523 |
| | | 30 | 30 | 23.21152 |
| | | 30 | 20 | 14.8294 |
| | | 30 | 10 | 7.199424 |

LIGHT GUIDE PLATE, VEHICLE LAMP

TECHNICAL FIELD

The present invention relates to a light guide plate that presents a stereoscopic image and a vehicle lamp using the light guide plate.

BACKGROUND

The image display device disclosed in Patent Document 1 provides one example of a known optical device that presents a stereoscopic image.

FIGS. 18A through 18C illustrate configurations of an image display device 100 disclosed in the Japanese Patent Publication. As shown in FIG. 18A, the image display device 100 disclosed in the Patent Document 1 is equipped with a light guide plate 110, a light source 101 provided at an end of the light guide plate 110. Left-eye display patterns 111a, 112a, 113a having a plurality of first prisms and right-eye display patterns 111b, 112b, 113b having a plurality of second prisms are formed on the rear surface of the light guide plate 110. The left-eye display pattern 111a uses a plurality of first prisms P1 to create a symbol "A" in a two-dimensional plane, and the right-eye display pattern 111b uses a plurality of second prisms P2 to create a symbol "A" in a two-dimensional plane (FIG. 18B).

In this configuration, the plurality of the first and second prisms reflect light from the light source 101 to thereby present a left-eye image and a right-eye image toward the front surface of the light guide plate 110. When an observer views the left-eye image and the right-eye image, the observer perceives each of the observed images 120 of "A", B", and "C" as a planar image that appears three-dimensional and arranged in that order from furthest to nearest as illustrated in FIG. 18C. The observed images 120 are perceived as floating at the intersection of the optical paths of the light rays from the left-eye images and right-eye images; therefore, the observed images with larger intervals have intersection points closer to the observer and thus appear closer to the observer. Accordingly, the observer is able to perceive a natural three-dimensional presentation.

RELATED ART

Patent Documents

Patent Document 1: Japanese Patent Publication No. 2012-118378 (published on Jun. 21, 2012)

SUMMARY

Technical Problem

FIG. 19A is a perspective view illustrating a stereoscopic image formed emerging sideways from a wall along a corridor; FIG. 19B is a plan view illustrating the relationship between the stereoscopic image and an observer viewing said stereoscopic image. Consider a stereoscopic image emerging sideways from a wall three meters (3 m) ahead along a corridor as seen by an observer one meter (1 m) away from a wall (FIG. 19A). In order for the observer to recognize this as a stereoscopic image, the observer must at least be able to view the image from a viewing angle up to 75° relative to the normal of the wall (FIG. 19B).

However, an existing image display device 100 is at a disadvantage in that the stereoscopic image produced thereby in the space appears distorted and hardly appears three dimensional when viewed from an area more than 60° relative to the normal of the wall. The area like this is called a wide viewing angle area in the present specification.

The visibility of the stereoscopic image degrades in a wide viewing angle area for two reasons.

FIGS. 20A and 20B explain the first reason the visibility of the stereoscopic image degrades in a wide viewing angle area. The first reason the visibility of the stereoscopic image degrades in a wide viewing angle area is an increased spread sensitivity in the wide viewing angle area. Here, "spread sensitivity" is the ratio of the amount of change in an emission angle of light emitted to the amount of change in a light guide angle with a small change to the angle at which light is directed. When the surface from which the light is emitted from the light guide plate is an emission surface, the light guide angle is an angle formed by an optical path of light toward the emission surface with respect to the normal line of the emission surface on the inner side of the light guide plate. The emission angle is the angle formed by the optical path of the light emitted from the emission surface with respect to the normal line of the emission surface on the outer side of the light guide plate.

Consider light in the light guide plate has an emission angle γ relative to the normal of the emission surface; at an emission angle γ=30°, spread sensitivity to the shape of the stereoscopic image is roughly 1 (FIG. 20A and FIG. 20B). However, the spread sensitivity to the shape of the stereoscopic image increases drastically at the emission angle γ=60° or more, and is about 19 at the emission angle γ=75°. As a result, in the wide viewing angle area, when the light guide angle changes due to errors in the shape, the emission angle changes greatly, which largely impacts blurring of the stereoscopic image.

FIG. 21 explains the second reason the visibility of the stereoscopic image degrades in a wide viewing angle area. The second reason relates to a range for perceiving any stereoscopic image. As shown in FIG. 21, when a stereoscopic image is produced, blurring is less likely to occur in the vicinity of directly in front of the light guide plate because a narrow range is perceptible thereat. However, blurring is more perceptible in a wide viewing angle area, as the light emitted from a wide range is viewed in the area.

One or more embodiments of the present invention aims to provide an optical device capable of preventing the visibility of a stereoscopic image from deteriorating in a space within a wide viewing angle area.

Means for Solving Problem

To address the foregoing, a light guide plate according to one embodiment of the present invention is configured to guide light incident thereon, change the optical path of the light guided, and emit said light from an emission surface thereof, and thereby form an image in a space; the light guide plate including: a group of optical-path deflectors that change the optical path of the light, the group of optical-path deflectors deflecting the light incident on the light guide plate from a first light source arranged at a predetermined position to form an image in the space within a predetermined first angle range with respect to a reference plane that is orthogonal to the emission surface and parallel to a side surface of the light guide plate, and deflecting the light incident on the light guide plate from a second light source, arranged at a position away from the position of the first light source, to form an image in a space within a predetermined second angle range with respect to the reference plane; wherein the first angle range and the second angle range may be separate from each other or adjoining each other.

A light guide plate according to one embodiment of the present invention is configured to guide light incident thereon, change the optical path of the guided light and emit said light from an emission surface thereof to form an image in a space, wherein the light guide plate includes first optical-path deflectors and a second optical-path deflectors, with the first optical-path deflectors changing the optical path of only the light incident on the light guide plate from the first light source arranged at a predetermined position to form a first image in a space, the second optical-path deflectors changing the optical path of only the light incident on the light guide plate from a second light source arranged at a position away from the position of the first light source to form a second image in a space, and the first optical-path deflectors and the second optical-path deflectors at least partially overlapping with each other in a direction in which light incident from the first light source and the second light source is guided.

Effects

According to one aspect of the present invention, an optical device may be provided that is capable of preventing a deterioration in the visibility of a stereoscopic image in a space within a wide viewing angle area.

BRIEF DESCRIPTION OF THE DRAWINGS

FIG. 8A shows a state where the image-forming angle is virtually 0°, FIG. 8B shows a state where the image-forming angle is positive and small, and FIG. 8C shows the state where the image-forming angle is positive and large, respectively;

FIG. 12A is a table showing an example of the relationship between the distance x, the angle θ, and the interval L when the light guide plate is formed of polycarbonate, and FIG. 12B is a table showing an example of the relationship between the distance x, the angle θ, and the interval L when the light guide plate is formed of acrylic;

DETAILED DESCRIPTION

First Embodiment

An embodiment according to one aspect of the present invention (hereinafter, also referred to as "the present embodiment") is described below with reference to the drawings. However, the present embodiment described below is merely an example of the present invention in all respects. It goes without saying that various improvements and modifications can be made without departing from the scope of the present invention. That is, in utilizing the present invention, a specific configuration suitable for the embodiment may be adopted as needed.

§ 1 EXAMPLE OF APPLICATION

First, an example of a situation to which the present invention is applied is described with reference to FIGS. 1 through 5.

Figure 1:
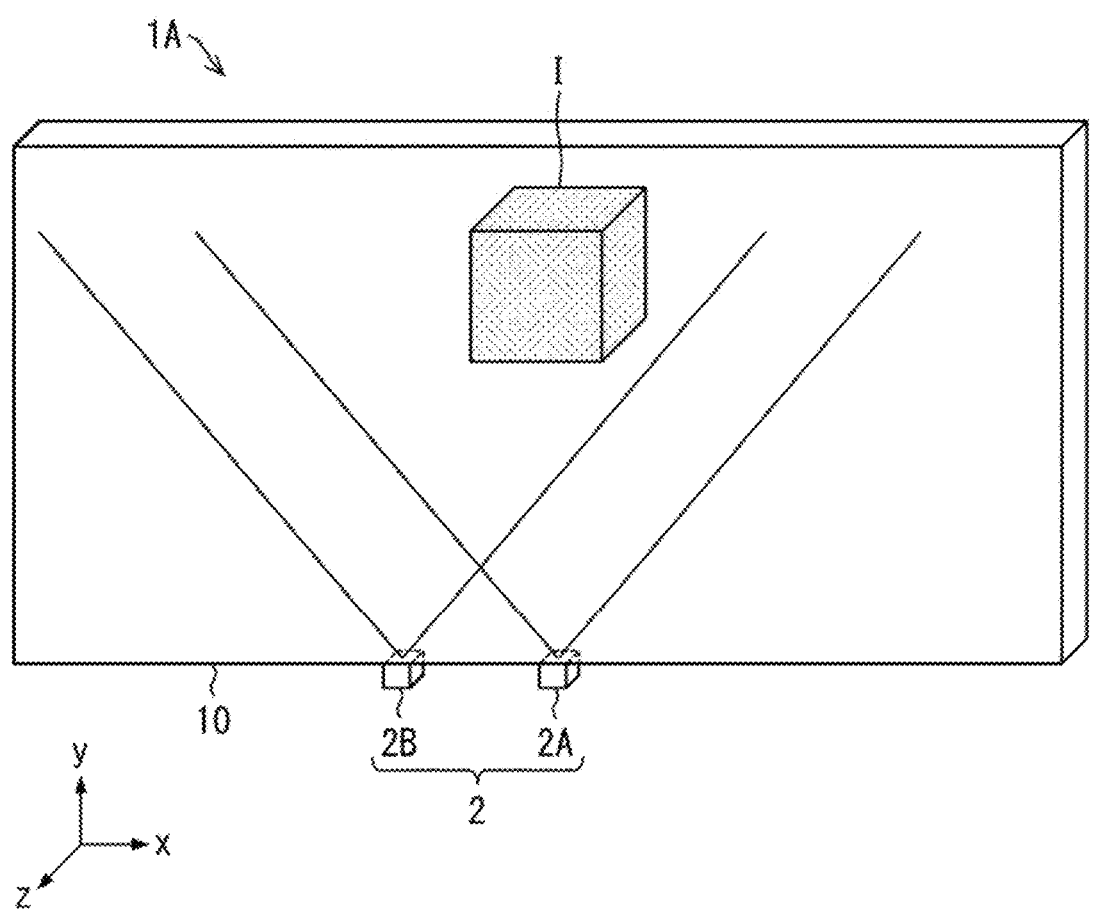
FIG. 1 is a schematic view of an optical device to which the present invention is applied.

FIG. 1 shows a schematic view of an optical device 1A to which the present invention is applied. As shown in FIG. 1, the optical device 1A includes a light source 2 and a light guide plate 10.

The light source 2 causes light to be incident on the light guide plate 10. In the example shown in FIG. 1, the light source 2 includes a first light source 2A and a second light source 2B. The first light source 2A and the second light source 2B are respectively light emitting diodes. However, the first light source 2A and the second light source 2B may be light sources other than a light emitting diode. The light source 2 may further include a light source other than the first light source 2A and the second light source 2B. It should be noted that both the first light source 2A and the second light source 2B cause light to enter an incidence surface 11 described later. That is, the surface on which the light from the first light source 2A enters the light guide plate 10 and the surface on which the light from the second light source 2B enters the light guide plate 10 are a same side surface.

The light guide plate 10 guides the light incident on the incidence surface 11, changes the optical path of the guided light, and causes the light to exit from the emission surface to form a stereoscopic image I (image) in space. The light guide plate 10 is produced from a resin material which is transparent and has a relatively high refractive index. The light guide plate 10 may be produced from, for instance, a polycarbonate resin (PC), a poly methyl methacrylate resin (PMMA), or the like.

The light guide plate 10 includes a group of optical-path deflectors 20 (FIG. 3) described later. Further, the light guide plate 10 has an emission surface 12 (FIG. 3) through which the light exits. The light is guided through the light guide plate 10, deflected by the group of optical-path deflectors 20 and caused to exit from the emission surface 12 to form the stereoscopic image I in a space.

Figure 2:
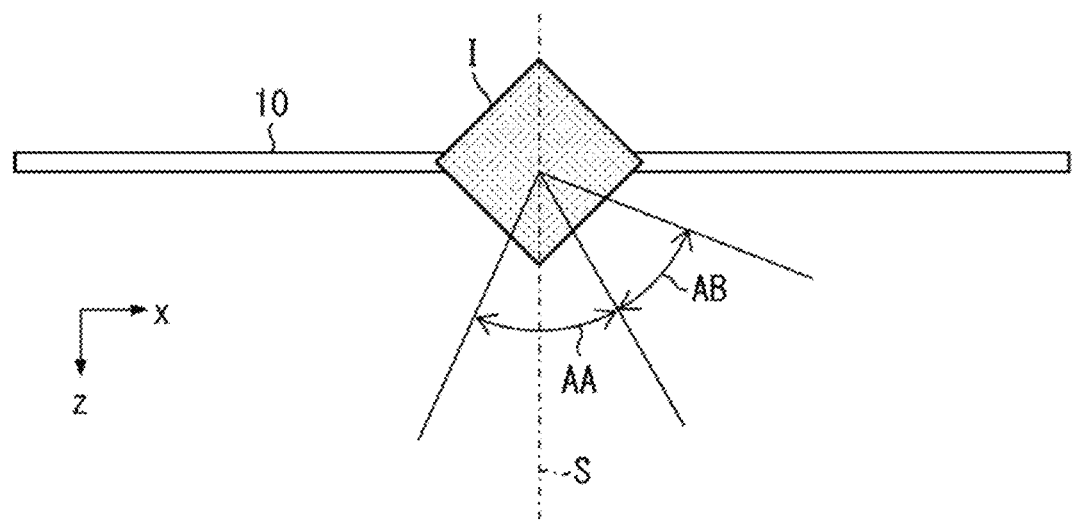
FIG. 2 is a diagram for describing a relationship between an image-forming angle and a light source for the light forming a stereoscopic image in the optical device.

FIG. 2 is a diagram for describing a relationship between an image-forming angle and the light source for the light forming the stereoscopic image I in the optical device 1A. In the optical device 1A, the light source for the light forming the stereoscopic image I differs depending on the image-forming angle. The image-forming angle is the angle of the position where the stereoscopic image I is formed to a reference plane S of the light guide plate 10. The reference plane S is a plane orthogonal to the emission surface 12 and parallel to a side surface 14 (FIG. 3) of the light guide plate 10.

For example, the light from the first light source 2A forms the stereoscopic image I at the image-forming angle within a first angle range AA, an angle range close to directly in front of the light guide plate 10. Whereas, the light from the second light source 2B forms the stereoscopic image I at the image-forming angle within a second angle range AB, an angle range further away from directly in front of the light guide plate 10 than the angle range AA. In other words, the group of optical-path deflectors 20 changes the optical path of the light incident on the light guide plate 10 from the first light source 2A arranged at a predetermined position, to form an image in the space within the angle range AA with respect to the reference plane S. The group of optical-path deflectors 20 also changes the optical path of the light incident on the light guide plate 10 from the second light source 2B arranged at a position away from the position of the first light source 2A, to form an image in the space within the angle range AB with respect to the reference plane S.

In the example shown in FIG. 2, the angle range AA and the angle range AB are adjoining each other. However, the angle range AA and the angle range AB may be separate from each other. Meanwhile, when the angle range AA and the angle range AB have a range in which they overlap each other, the stereoscopic image I appears double in that area, which is not preferable.

The configuration of the light guide plate 10 for forming the image I in the space is described below.

Figure 3:
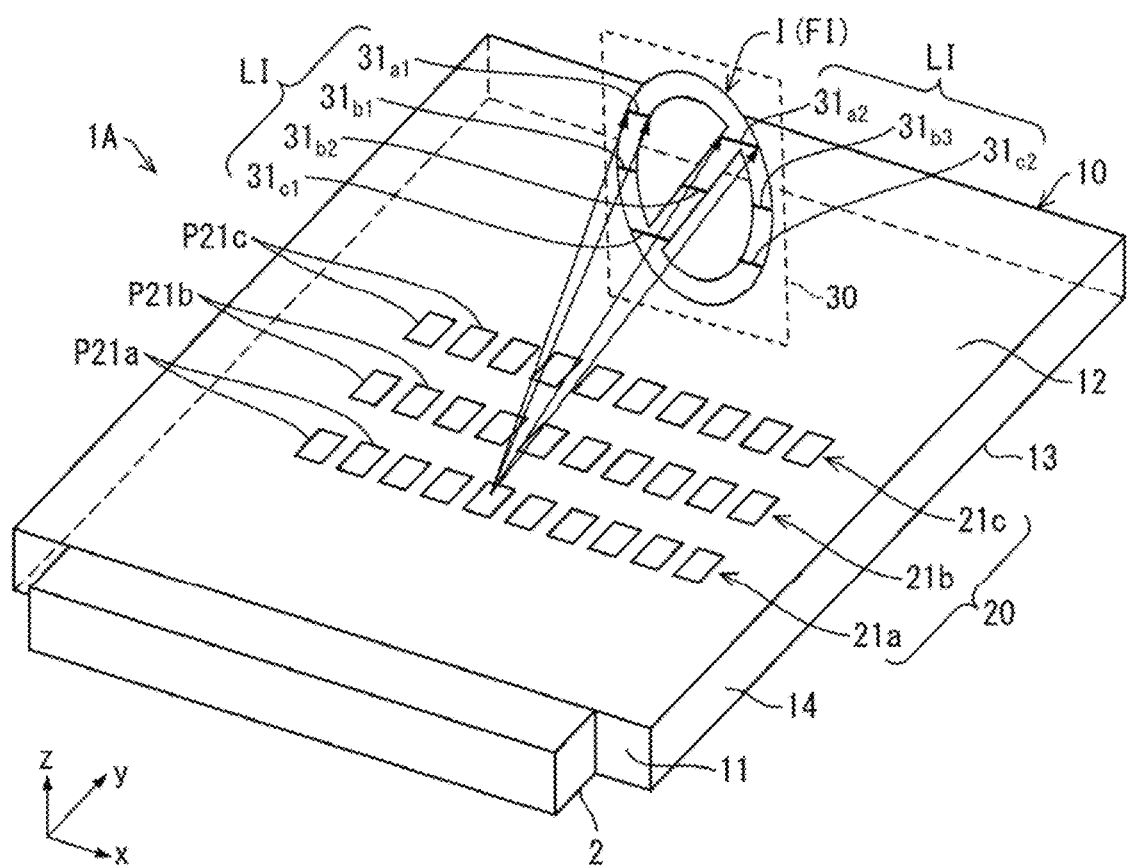
FIG. 3 is a perspective view of the configuration within the optical device for forming a planar image.
Figure 4:
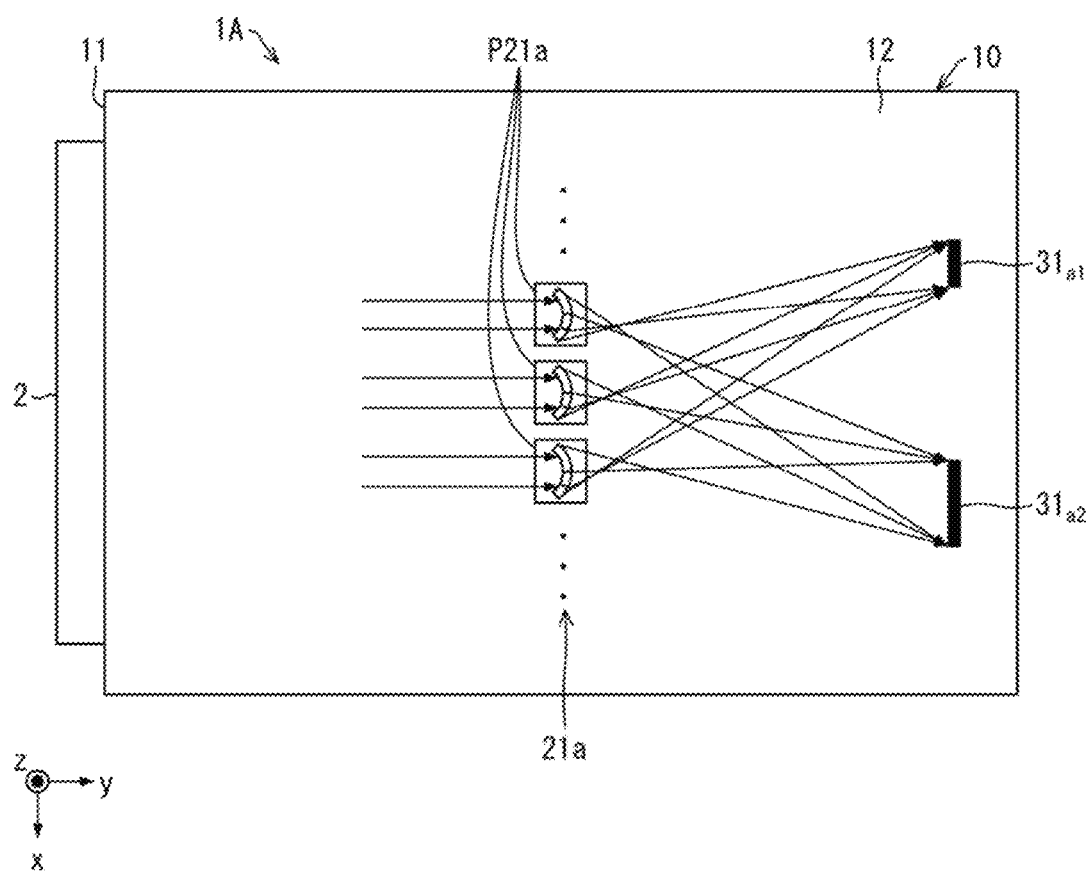
FIG. 4 is a plan view of the configuration within the optical device for forming a planar image.
Figure 5:
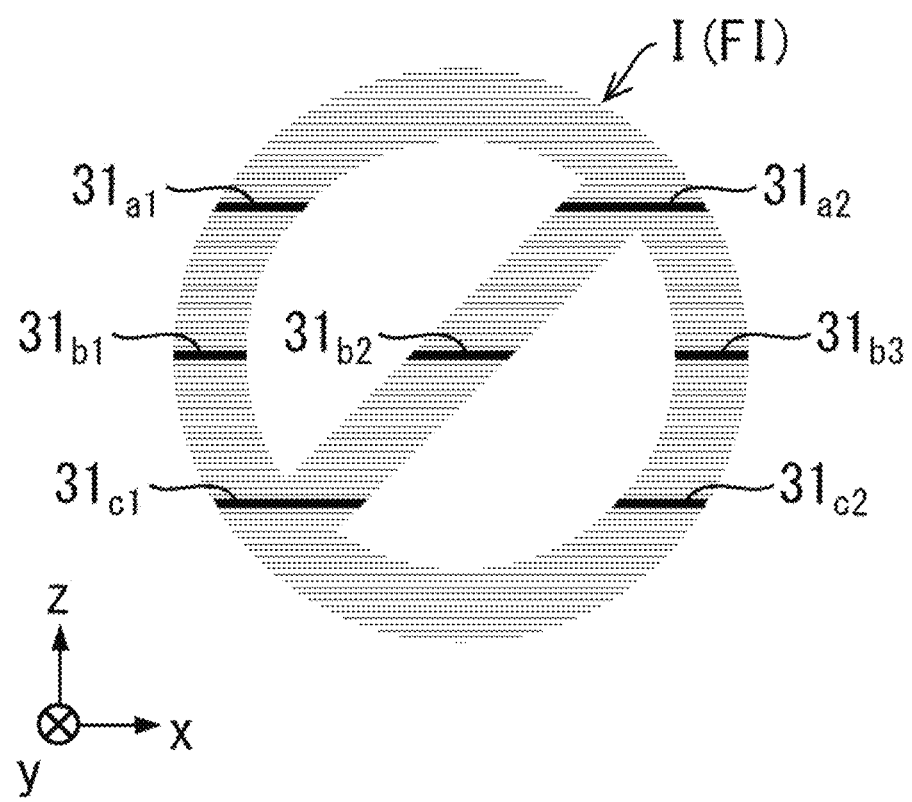
FIG. 5 is a front view illustrating an example of a stereoscopic image made up of planar images formed by the optical device.

FIG. 3 is a perspective view of the configuration within the optical device for forming a planar image FI. FIG. 4 is a plan view of the configuration within the optical device 1A for forming the planar image FI. FIG. 5 is a front view illustrating an example of the stereoscopic image I made up of a planar image FI formed by the optical device 1A.

As shown in FIG. 3, the light guide plate 10 includes: an incidence surface 11 where light enters from the light source 2; an emission surface 12 which is the front surface of the light guide plate 10 and which emits light; and a rear surface 13 whereon a group of optical-path deflectors 20, discussed below, is formed. The emission surface 12 and the rear surface 13 are parallel to each other, and the incidence surface 11 is perpendicular to both the emission surface 12 and the rear surface 13. Further, the light guide plate 10 has a side surface 14 which is perpendicular to all of the incidence surface 11, the emission surface 12 and the rear surface 13.

The group of optical-path deflectors 20 is formed on the rear surface 13. The group of optical-path deflectors 20 changes the optical path of the light directed through the light guide plate 10 and emits the light from the emission surface 12 to form the stereoscopic image I in space. For instance, the group of optical-path deflectors 20 may be prisms.

That is, as above described, in FIG. 3, the light emitted from the light source 2 enters the light guide plate 10 through the incidence surface 11. The light incident on the light guide plate 10 is totally reflected between the emission surface 12 and the rear surface 13 of the light guide plate 10 and is directed to the farther end of the light guide plate 10. Then, the group of optical-path deflectors 20 deflects the optical path of the light in a specific direction, breaking down the total reflection condition, and the light is emitted from the emission surface 12.

Note that a rectangular coordinate system of x axis, y axis, and z axis is used at times in describing the first embodiment. In the first embodiment, the z-axis direction is defined as a direction perpendicular to the emission surface 12, where the positive z-axis direction is from the rear surface 13 toward the emission surface 12. The y-axis direction is defined as perpendicular to the incidence surface 11, where the positive y-axis direction is from the incidence surface 11 toward a planar image FI facing the incidence surface 11. Further, the x axis is along a direction orthogonal to the incidence surface 11 along a lateral surface of the light guide plate 10, where the positive x-axis direction is from the left side surface toward the right side surface in FIG. 1. In order to avoid redundant description, the plane parallel to the xy plane may be referred to as the xy surface, the plane parallel to the yz plane may be referred to as the yz surface, and the plane parallel to the xz plane may be referred to as the xz surface. Regarding the angle of the light guide plate 10 with respect to the reference plane S, an angle in the negative x direction side is a negative angle, and an angle in the positive x direction side is a positive angle.

Assume, for example, that the optical device 1A produces a stereoscopic image I in a stereoscopic image forming plane 30 that is parallel to the xz plane as illustrated in FIG. 3; and more specifically, that the optical device 1A forms a planar image FI as a circle with a diagonal line therethrough.

A plurality of groups of first optical-path deflectors 21a, 21b, 21c, . . . is formed on the rear surface 13 of the light guide plate 10 in the optical device 1A; the groups of first optical-path deflectors 21a, 21b, 21c, . . . serve as the group of optical-path deflectors 20. Each group of first optical-path deflectors 21a, 21b, 21c, . . . is formed from a plurality of prisms provided along a direction parallel to the x axis. For example, the group of first optical-path deflectors 21a is made up of a plurality of prisms P21a. Similarly, the group of first optical-path deflectors 21b is made up of a plurality of prisms P21b, and the group of first optical-path deflectors 21c is made up of a plurality of prisms P21c.

For example, the prisms P21a change the optical path of incident light, spreading the light in a direction parallel to the xy plane, and causing the light to exit from the emission surface 12. The light beams emitted from the emission surface 12 due to the prisms P21a are, for the most part, a line intersecting with the stereoscopic image forming plane 30. As illustrated in FIG. 3 and FIG. 4, the prisms P21a cause the light beams to exit from the emission surface 12. The two light beams emitted intersect with the stereoscopic image forming plane 30 at a line $31a_1$ and a line $31a_2$. As illustrated in FIG. 3, any of the prisms P21a included in the group of first optical-path deflectors 21a and other prisms P21a therein similarly cause light beams to exit from the emission surface 12 and intersect with the stereoscopic image forming plane 30 at the line $31a_1$ and the line $31a_2$. The line $31a_1$ and the line $31a2$ are within a plane substantially parallel to the xy plane and form a part of the stereoscopic image I. Thus, the light from the plurality of prisms P21a belonging to the group of first optical-path deflectors 21a forms a line image LI, more specifically the line $31a_1$ and the line $31a_2$. The light that forms the images of the line $31a_1$ and the line $31a_2$ may be provided by at least two prisms P21a and P21a in the group of first optical-path deflectors 21a provided at different positions along the x-axis direction.

That is, each of the plurality of prisms P21a belonging to the group of first optical-path deflectors 21a causes light incident thereon to spread along the x-axis direction within a plane parallel to the emission surface 12; the plurality of prisms P21a causes light having an intensity distribution according to the images of the lines $31a_1$ and $31a2$ to exit from the emission surface 12. Hereby, light from the plurality of prisms P21a belonging to the group of first optical-path deflectors 21a and arranged along the x-axis direction is the light that forms the images of the line $31a_1$ and the line $31a_2$.

As illustrated in FIG. 3, each of the prisms P21b in the group of first optical-path deflectors 21b similarly changes the optical path of light incident thereon, spreads the light in a direction parallel to the xy plane, and causes three light beams to exit from the emission surface 12. The three light beams emitted from the emission surface 12 intersect with the stereoscopic image forming plane 30 at the line $31b_1$, line $31b_2$, and line $31b_3$. Any of the prisms P21b included in the group of first optical-path deflectors 21b and other prisms P21b therein similarly cause light beams to exit from the emission surface 12 and intersect with the stereoscopic image forming plane 30 at the lines $31b_1$, $31b_2$, $31b_3$. In this way, each of the plurality of prisms P21b belonging to the group of first optical-path deflectors 21b causes light incident thereon to spread along the x-axis direction within a plane parallel to the emission surface 12; the plurality of prisms P21b causes light having an intensity distribution according to the images of the lines $31b_1$, $31b_2$, $31b_3$ to exit from the emission surface 12. Hereby, light from the plurality of prisms P21b belonging to the group of first optical-path deflectors 21b and arranged along the x-axis direction is the light that forms the images of the lines $31b_1$, $31b_2$, and $31b_3$. The lines $31b_1$, $31b_2$ and $31b_3$ are within a plane substantially parallel to the xy plane and form a part of the stereoscopic image I.

Here, the lines $31b_1$, $31b_2$, $31b_3$ and the lines $31a_1$, $31a_2$ are formed at different locations along the z-axis direction in the stereoscopic image forming plane 30.

As illustrated in FIG. 3, the prisms P21c in the group of first optical-path deflectors 21c similarly changes the optical path of light incident thereon, spreads the light in a direction parallel to the xy plane, and causes two light beams to exit from the emission surface 12. The two light beams emitted from the emission surface 12 intersect with the stereoscopic image forming plane 30 at a line $31c_1$ and a line $31c_2$. Any of the prisms P21c included in the group of first optical-path deflectors 21c and other prisms P21c therein similarly cause light beams to exit from the emission surface 12 and intersect with the stereoscopic image forming plane 30 at the lines $31c_1$, $31c_2$. Thus, each of the plurality of prisms P21c belonging to the group of first optical-path deflectors 21c causes light incident thereon to spread within a plane parallel to the emission surface 12; each of the plurality of prisms P21c causes light having an intensity distribution according to the images of the lines $31c_1$, $31c_2$ to exit from the emission surface 12. Hereby, light from the plurality of prisms P21c belonging to the group of first optical-path deflectors 21c and arranged along the x-axis direction is the light that forms the images of the lines $31c_1$ and $31c_2$. The lines $31c_1$, $31c_2$ are within a plane substantially parallel to the xy plane and form a part of the stereoscopic image I.

Here, the lines $31c_1$, $31c_2$, the lines $31b_1$, $31b_2$, $31b_3$, and the lines $31a_1$, $31a_2$ are formed at different locations along the z-axis direction in the stereoscopic image forming plane 30.

In FIG. 3, the lines $31c_1$, $31c_2$, the lines $31b_1$, $31b_2$, $31b_3$, and the lines $31a_1$, $31a_2$ are formed at different locations along the z-axis direction in the stereoscopic image forming plane 30, and are each perceived as isolated as previously described. However, in reality, the groups of first optical-path deflectors 21a, 21b, 21c may be made up of more groups of first optical-path deflectors 21a, 21b, 21c, . . . with a smaller gap between the groups of first optical-path deflectors 21a, 21b, 21c, . . . in the y-axis direction. Alternatively, the optical-path deflection angle may be selected for each of the prisms P21a, P21b, P21c so that even if the groups of first optical-path deflectors 21a, 21b, 21c are separated along the y-axis direction, the lines $31a_1$, $21a_2$, the lines $31b_1$, $31b_2$, $31b_3$, and the lines $31c_1$, $31c_2$ are formed at locations that are closer to each other along the z-axis direction. Therefore, the planar image FI of a circle with a diagonal line therethrough can be perceived as the stereoscopic image I as illustrated in FIG. 5.

Thus, the optical device 1A groups light beams from each plurality of prisms P21a, P21b, P21c in the groups of first optical-path deflectors 21a, 21b, 21c, . . . which are arranged two-dimensionally; hereby, the optical device 1A uses the light beams to form the planar image FI that is presented in a space near an observer. Therefore, an observer is able to recognize a stereoscopic image I constituted from a planar image FI over a wide range of positions along the y-axis direction.

§ 2 CONFIGURATION EXAMPLE

Next, a specific configuration of the present invention is described with reference to FIGS. 6 through 10.

Figure 6:
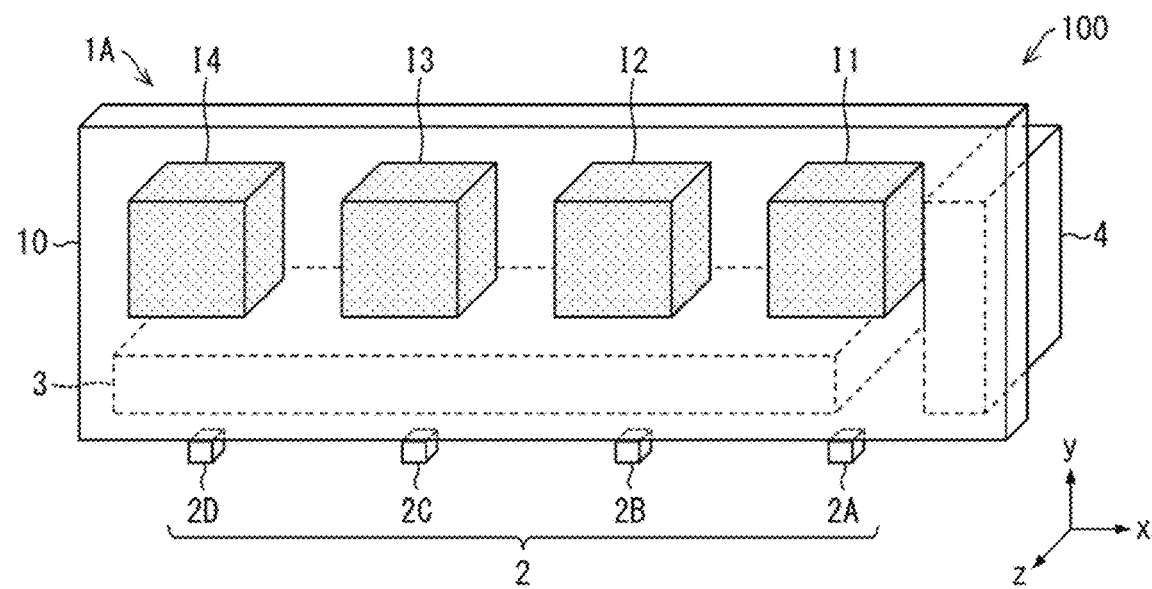
FIG. 6 is a schematic view of a vehicle lamp including the optical device.

FIG. 6 is a schematic view of a vehicle lamp 100 including the optical device 1A. As illustrated in FIG. 6, the vehicle lamp 100 includes the optical device 1A. In an example shown in FIG. 6, the optical device 1A includes a first light source 2A through a fourth light source 2D and the light guide plate 10, and forms stereoscopic images I1 though I4. The vehicle lamp 100 further includes a brake light 3 and a direction indicator light 4. The vehicle lamp 100 is a lamp including a display apparatus, provided on the right and left of the rear part of a vehicle.

Figure 7A:
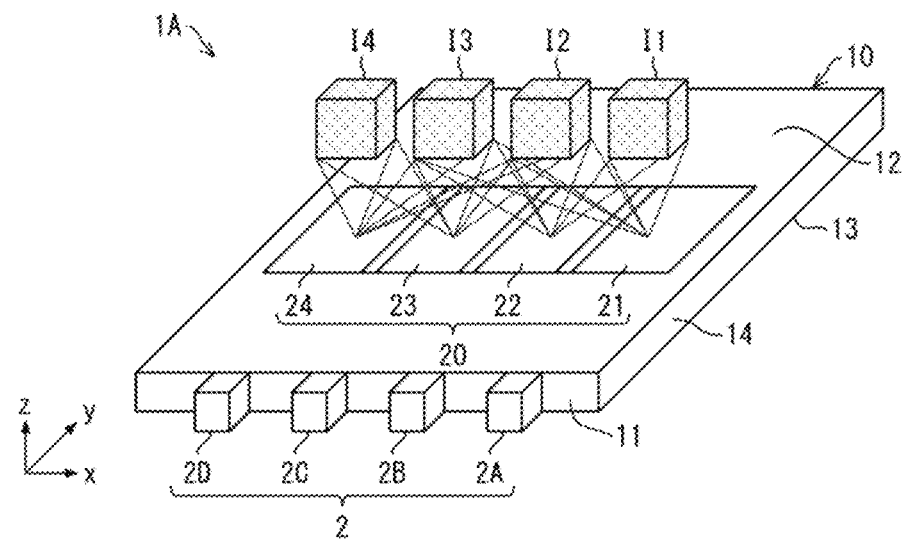
FIGS. 7A and 7B are a perspective view and a side view, respectively, illustrating a configuration of the optical device.
Figure 7B:
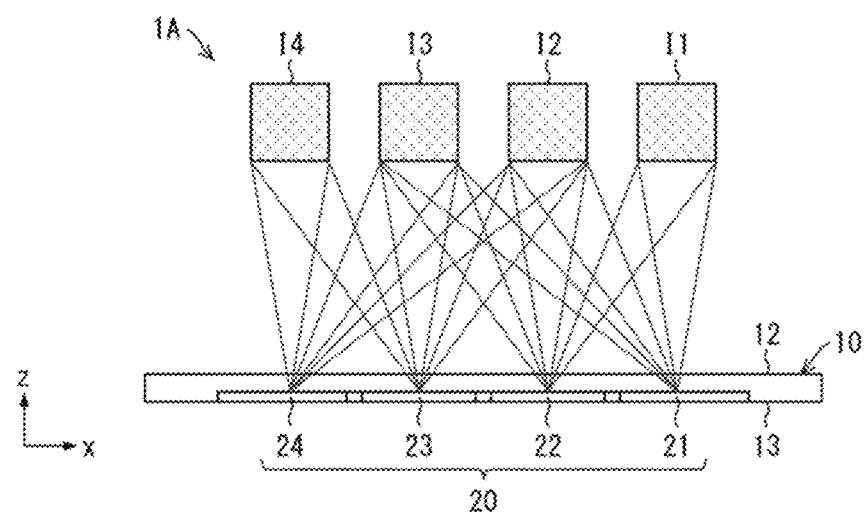

FIGS. 7A and 7B are a perspective view and a side view, respectively, illustrating a configuration of the optical device 1A. The light guide plate 10 has the first optical-path deflectors 21 through fourth optical-path deflectors 24 as a group of optical-path deflectors 20 on the rear surface 13 thereof. Each of the first optical-path deflectors 21 through the fourth optical-path deflectors 24 changes the optical path of light incident on the light guide plate 10 from any of the first light source 2A through the fourth light source 2D to form the stereoscopic images I1 through I4 in the space (FIG. 6). The first optical-path deflectors 21 through the fourth optical-path deflectors 24 may also be groups of optical-path deflectors including a plurality of prisms that change the optical path of light. The areas in which the first optical-path deflectors 21 through the fourth optical-path deflectors 24 are respectively formed partially overlap each other.

In the optical device 1A, the number of light sources included in the light source 2 and the number of optical-path deflectors included in the group of optical-path deflectors 20 may be three or less, or greater than four. Further, the number of light sources included in the light source 2 and the number of optical-path deflectors included in the group of optical-path deflectors 20 may be different from each other.

Furthermore, in the optical device 1A shown in FIGS. 7A and 7B, the first optical-path deflectors 21 are positioned outside the area through which the light emitted by the fourth light source 2D is directed. Similarly, the fourth optical-path deflectors 24 are positioned outside the area through which the light emitted by the first light source 2A is directed. That is, at least a part of the group of optical-path deflectors 20 is positioned outside the area through which the light emitted by the first light source 2A or the fourth light source 2D is directed.

In addition, in the optical device 1A, the stereoscopic images I1 through I4 are images of the same or similar designs repeated away from each other in the direction from the first light source to the second light source. Therefore, even if the light sources projecting the image are switched, it is unlikely for a user to recognize the switchover. This improves the visibility of the image.

Figure 8A:
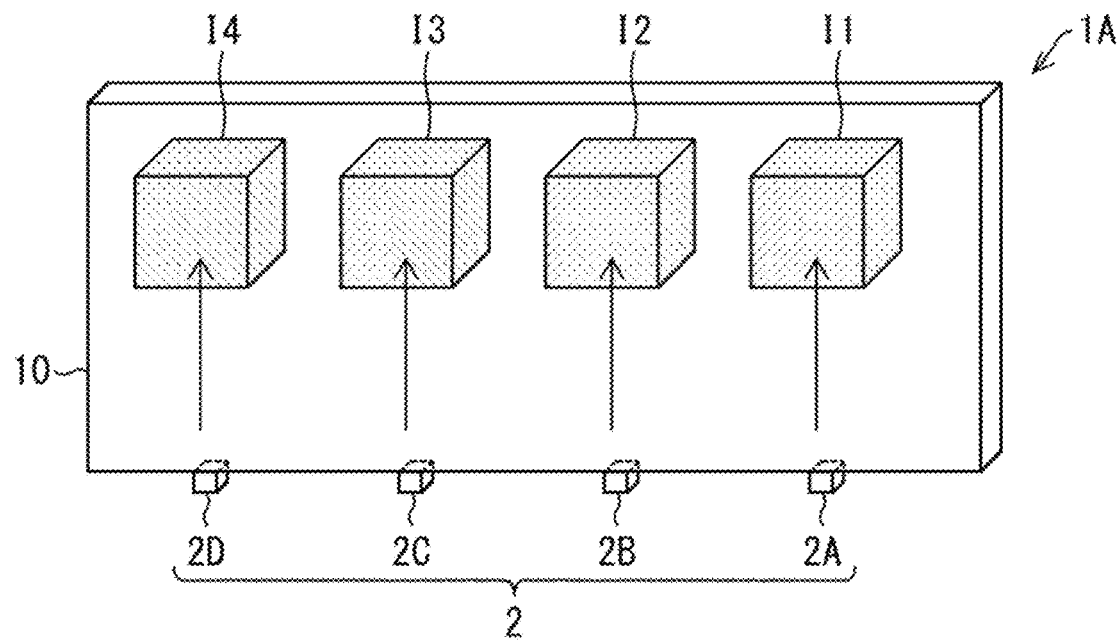
FIGS. 8A, 8B, and 8C are diagrams illustrating a relationship between an image-forming angle and a light source for the light forming a stereoscopic image.
Figure 8B:
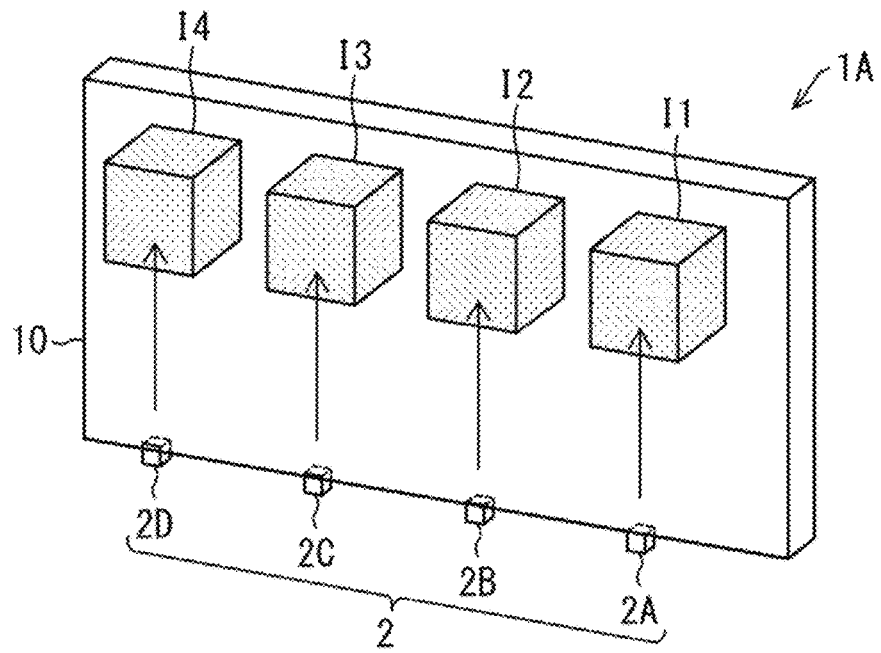
Figure 8C:
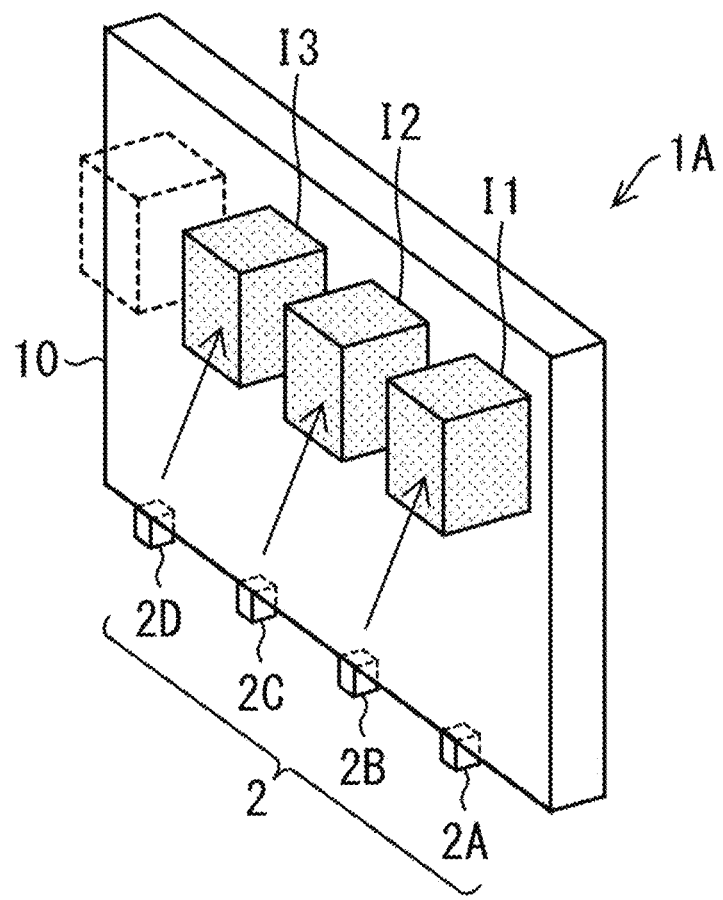

FIGS. 8A, 8B, and 8C are diagrams illustrating a relationship between an image-forming angle and a light source for the light forming each of stereoscopic images I1 through I4: FIG. 8A shows a state where the image-forming angle is virtually 0°, FIG. 8B shows a state where the image-forming angle is positive and small, and FIG. 8C shows a state where the image-forming angle is positive and large, respectively. When the image-forming angle is increased from 0°, the optical device 1A changes its state from the state depicted in FIG. 8A to the states depicted in FIGS. 8B and 8C in this order.

When the image-forming angle is virtually 0°, the stereoscopic image I1 is formed from the light emitted by the first light source 2A, as shown in FIG. 8A. Similarly, the stereoscopic images I2 through I4 are formed from light emitted by the second light source 2B through the fourth light source 2D, respectively. Further, when the image-forming angle is positive and small, the stereoscopic images I1 through I4 are formed from the light emitted by the first light source 2A through the fourth light source 2D, respectively (FIG. 8B), as in the case where the image-forming angle is virtually 0°.

In contrast, when the image-forming angle is positive and large, the stereoscopic image I1 is formed from the light emitted by the second light source 2B, the stereoscopic image I2 is formed from the light emitted by the third light source 2C, and the stereoscopic image I3 is formed from the light emitted by the fourth light source 2D. In this case, the light emitted by the first light source 2A does not form any stereoscopic image. Further, the stereoscopic image I4 is not formed.

When the image-forming angle is negative and has a large absolute value, the stereoscopic images I2 through I4 are formed from the light emitted by the first light source 2A through the third light source 2C, respectively, in the reverse order of the example shown in FIG. 8C. In this case, the light emitted by the fourth light source 2D does not form a stereoscopic image, and the stereoscopic image I1 is not formed.

It is preferable that the stereoscopic images I1 to I4 formed by the group of optical-path deflectors 20 are repetitions of the same or mutually similar designs repeated in the direction from the first light source 2A to the fourth light source 2D. When the stereoscopic images I1 to I4 are repetitions of the same or mutually similar designs, users are less likely to recognize any switchover of light sources when the light sources of the light forming the stereoscopic image are switched; users will see the stereoscopic image without sensing any incongruity.

Figure 9:
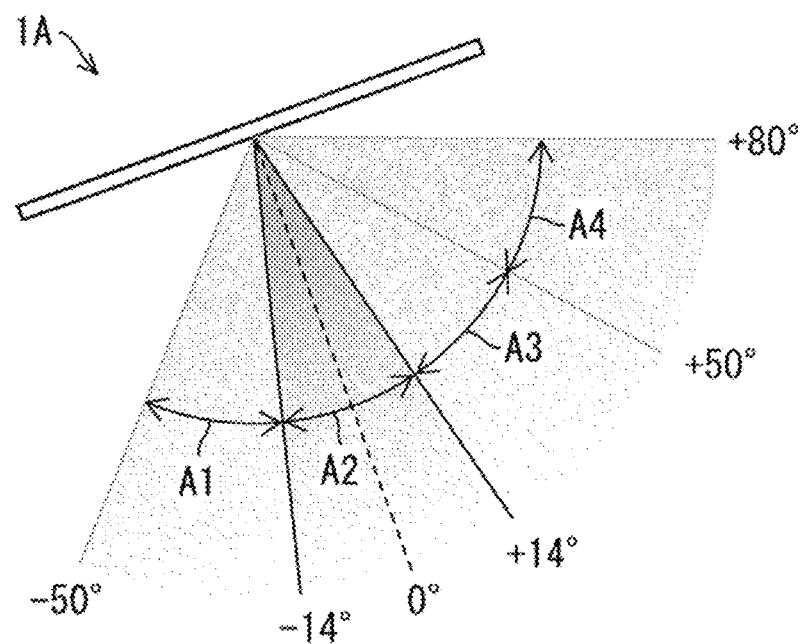
FIG. 9 is a diagram for describing a relationship between an image-forming angle and a light source in the optical device.

FIG. 9 is a diagram for describing a relationship between an image-forming angle and a light source in the optical device 1A. More specifically, FIG. 9 is a diagram showing a range of image-forming angles at which each light source projects the stereoscopic image I2, which is formed by the second optical-path deflectors 22 of the optical device 1A.

The light source used to produce the stereoscopic image I2 via the second optical-path deflectors 22 is different for each of the following image-forming angles: (i) within a second angle range A2 close to 0°; (ii) within a first angle range A1 with angles less than the second angle range A2; (iii) within a third angle range A3 with angles greater than the second angle range A2; and (iv) within a fourth angle range A4 with angles greater than the third angle range A3. Specifically, when the image-forming angle is within the second angle range A2, the light from the second light source 2B forms the stereoscopic image I2. Also, when the image-forming angle is within the first angle range A1, the light from the first light source 2A forms the stereoscopic image I2. Further, when the image-forming angle is within the third angle range A3, the light from the third light source 2C forms the stereoscopic image I2. Furthermore, when the image-forming angle is within the fourth angle range A4, the light from the fourth light source 2D forms the stereoscopic image I2.

In other words, the second optical-path deflectors 22 change the optical path of light incident on the light guide plate 10 from the first light source 2A to form an image in the space within the first angle range A1. Also, the second optical-path deflectors 22 change the optical path of light incident on the light guide plate 10 from the second light source 2B to form an image in the space within the second angle range A2. Further, the second optical-path deflectors 22 change the optical path of light incident on the light guide plate 10 from the third light source 2C to form an image in the space within the third angle range A3. Furthermore, the second optical-path deflectors 22 change the optical path of light incident on the light guide plate 10 from the fourth light source 2D to form an image in the space within the fourth angle range A4.

In this case, when varying the image-forming angle from −90° to +90°, the light sources for producing the stereoscopic image I2 change three (3) times: when the image-forming angle shifts (i) from the first angle range A1 to the second angle range A2; (ii) from the second angle range A2 to the third angle range A3; and (iii) from the third angle range A3 to the fourth angle range A4. The second angle range A2 may be, for example, a range of equal to or greater than −14° and equal to or less than +14°. The first angle range A1 may be, for example, a range of equal to or greater than −50° and less than −14°, and the third angle range A3 may be, for example, a range of greater than +14° and equal to or less than +50°. The fourth angle range A4 may be, for example, a range of greater than +50° and equal to or less than +80°. The first angle range A1, the second angle range A2, the third angle range A3, and the fourth angle range A4 are not limited to the above examples. However, the first angle range A1, the second angle range A2, the third angle range A3, and the fourth angle range A4 are either separate from or adjoining each other.

Figure 10:
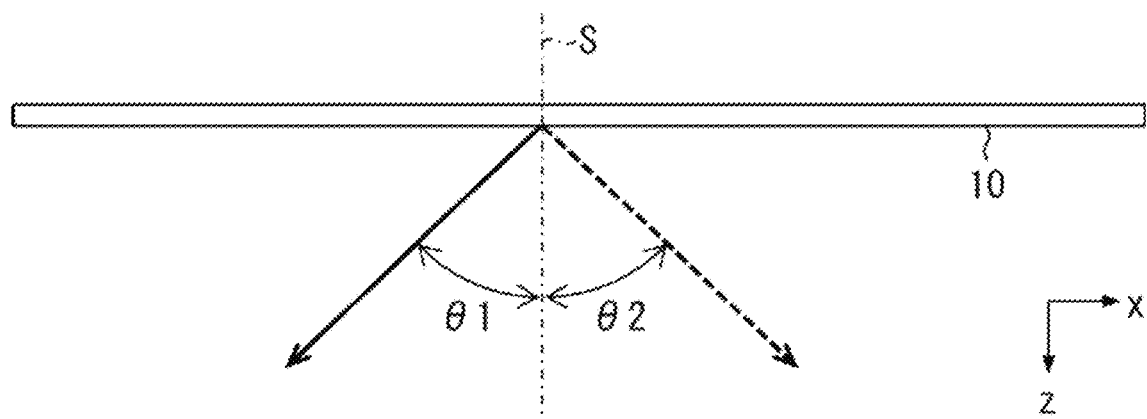
FIG. 10 is a top view showing parameters used to describe superposition of angular ranges.
Figure 11:
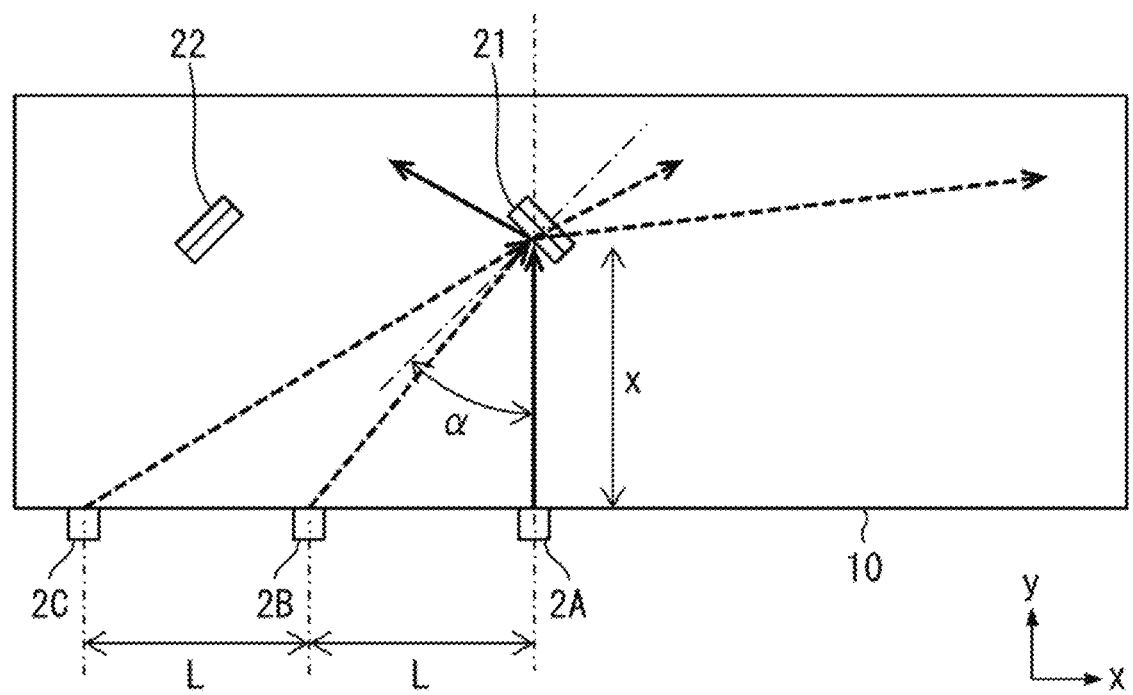
FIG. 11 is a plan view showing parameters used to describe superposition of angular ranges.

Conditions Under which the First Angle Range A1 and the Second Angle Range A2 do not Overlap Each Other FIG. 10 is a top view showing parameters used to describe superposition of angular ranges. FIG. 11 is a plan view showing parameters used to describe the superposition of angular ranges.

In FIG. 10, θ1 is the lower limit of the image-forming angle for the light from the first light source 2A. Concurrently, θ2 is the upper limit of the image-forming angle for the light from the second light source 2B. In FIG. 10, it is assumed that the light from the first light source 2A is deflected symmetrically with respect to the reference plane S. That is, the optical path of the light from the first light source 2A is modified to be within the angular range of equal to or greater than −θ1 and equal to or less than θ1. Here, as long as |θ1|≤|θ2|, the first angle range A1 and the second angle range A2 do not overlap each other.

As shown in FIG. 11, represents an interval within the light source 2, that is, a distance between the first light source 2A and the second light source 2B, and a distance between the second light source 2B and the third light source 2C; and 'x' represents the distance from the light source 2 to the group of optical-path deflectors 20. The inclined surface of the first optical-path deflectors 21 that reflects light has an inclination angle α with respect to the x-axis direction.

Using the parameters shown in FIGS. 10 and 11, conditions under which the first angle range A1 and the second angle range A2 do not overlap each other are described below. The light guide plate 10 has a refractive index n.

FIG. 12A is a table showing an example of the relationship between the distance x, the angle θ, and the interval L when the light guide plate 10 is formed of polycarbonate (refractive index n=1.585). FIG. 12B is a table showing an example of the relationship between the distance x, the angle θ, and the interval L when the light guide plate 10 is formed of acrylic (refractive index n=1.49). In the examples shown in FIGS. 12A and 12B, the angles φ of the inclined surface of the group of optical-path deflectors 20 with respect to the bottom surface of the light guide plate 10 are all 50°.

In FIGS. 12A and 12B, the position of the first optical-path deflectors 21 with respect to the first light source 2A is first determined so that the distance x takes a desired value (84, 50 or 30). Next, the inclination angle α is selected so that the angle θ1 takes a desired value (10°, 20°, 30°, or 40°). Then, the interval L between the first light source 2A and the second light source 2B is determined so that the angle θ2 coincides with the angle θ1.

Figure 13:
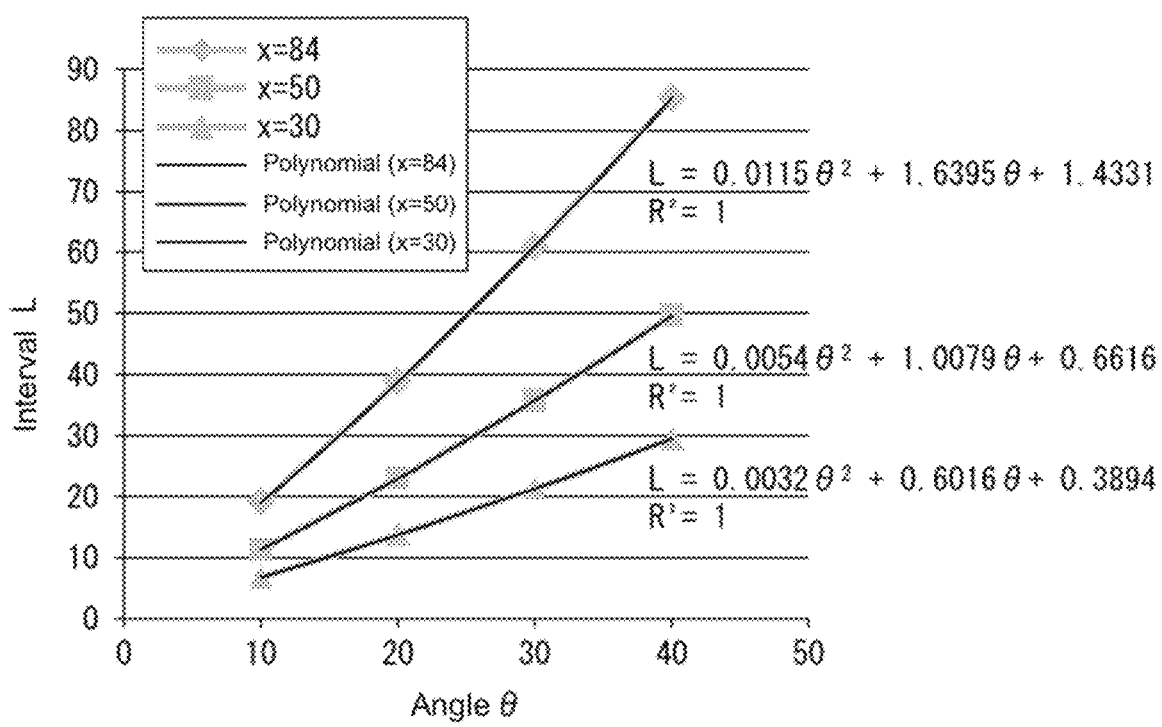
FIG. 13 is a graph showing the value of the interval L with respect to the angle θ for each value of the distance x in the example shown in FIG. 12A.

FIG. 13 is a graph showing the value of the interval L with respect to the angle θ for each value of the distance x in the example shown in FIG. 12A. As shown in FIG. 13, the value of the interval L with respect to the angle θ is approximated by a quadratic equation for each value of the distance x as follows:

$$x=84:L=0.0115\theta^2+1.6395\theta+1.4331$$

$$x=50:L=0.0054\theta^2+1.0079\theta+0.6616$$

$$x=30:L=0.0032\theta^2+0.6016\theta+0.3894$$

Based on these approximate equations, it is considered that the coefficients of the second-order term, the first-order term, and the zero-order term of the angle θ are all proportional to the value of the distance x.

Figure 14A:
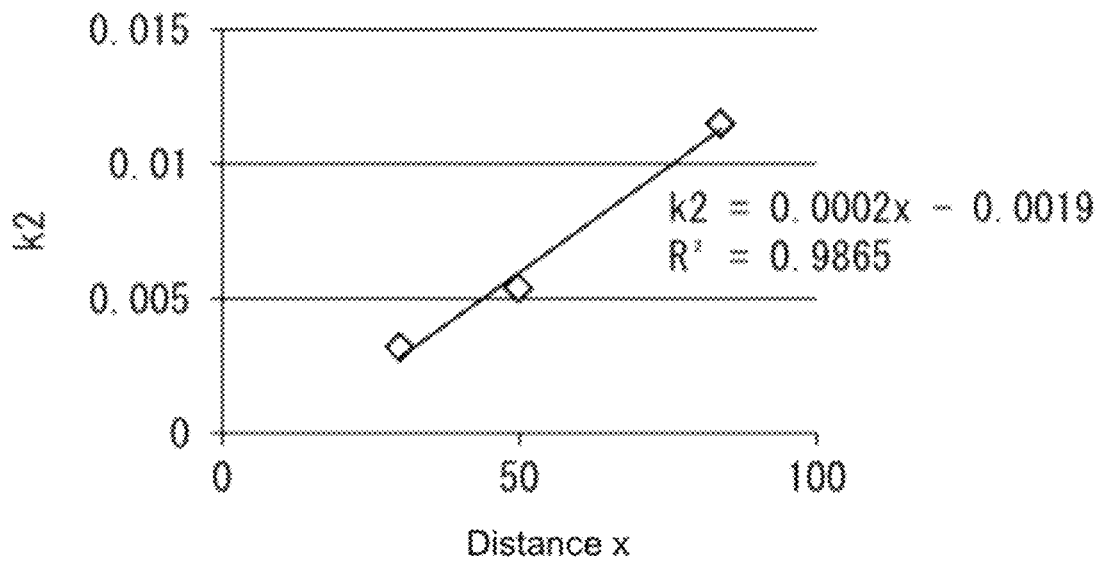
FIG. 14A is a graph showing the coefficient of the quadratic term of the angle θ with respect to the value of the distance x.
Figure 14B:
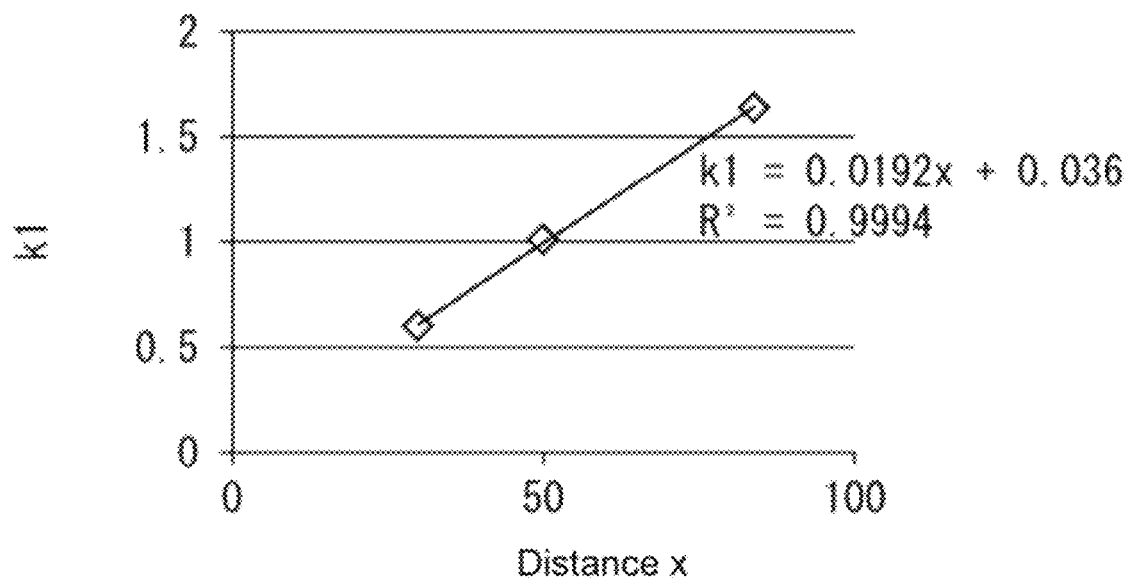
FIG. 14B is a graph showing the coefficient of the first-order term of the angle θ with respect to the value of the distance x.
Figure 14C:
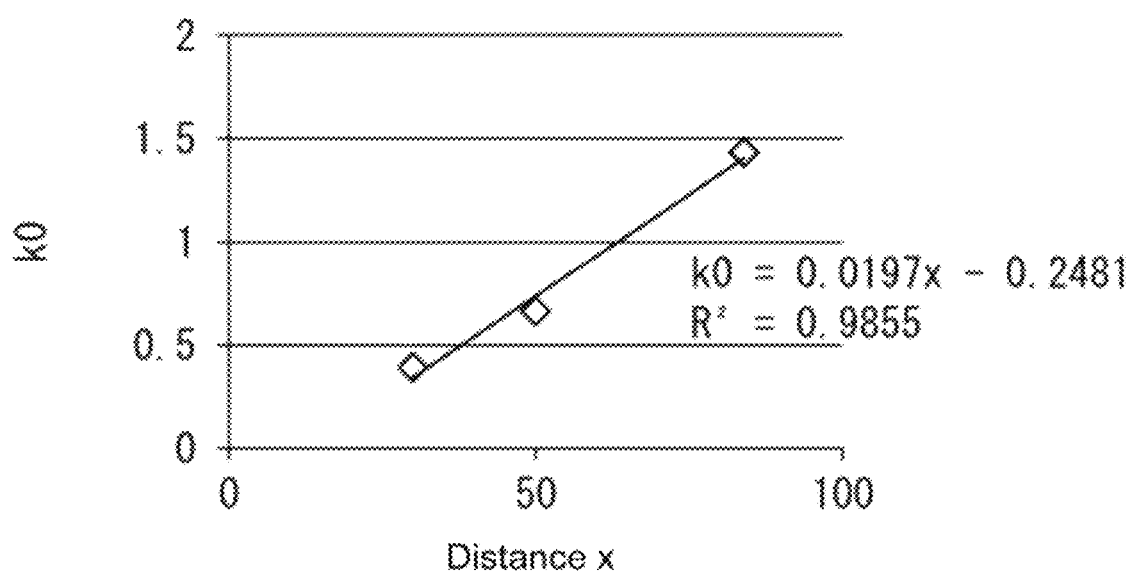
FIG. 14C is a graph showing a coefficient of a 0th-order term of the angle θ with respect to the value of the distance x.

FIG. 14A is a graph showing the coefficient of the quadratic term of the angle θ with respect to the value of the distance x. FIG. 14B is a graph showing the coefficient of the first-order term of the angle θ with respect to the value of the distance x. FIG. 14C is a graph showing a coefficient of a zero-order term of the angle θ with respect to the value of the distance x. As shown in FIGS. 14A, 14B and 14C, the coefficients of the second-order term, the first-order term, and the zero-order term of the angle θ are approximated with respect to the distance x as follows:

Second-order term of angle θ: $k2=0.0002x-0.0019$

First-order term of angle θ: $k1=0.0192x+0.036$

Zero-order term of angle θ: $k0=0.0197x-0.2481$

For the sake of convenience, the coefficients of the second-order term, the first-order term, and the zero-order term of the angle θ are expressed as k2, k1, and k0, respectively, in the above equations.

Therefore, the condition of the interval L under which the first angle range A1 and the second angle range A2 do not overlap each other is expressed as follows:

$$L>(0.0002x-0.0019)\theta^2+(0.0192x+0.036)\theta+(0.0197x-0.2481).$$

When the interval L satisfies the above expression, the distance between the first angle range A1 and the second angle range A2 may be excessive. Therefore, for example, the condition of the interval L may be expressed as follows:

$$L>(0.0002x-0.0019)\theta^2+(0.0192x+0.036)\theta+(0.0197x-0.2481)-10.$$

The value "−10" in the above formula was determined based on experimental data. Further, the two above-described types of conditions of the interval L are examples, and may be changed appropriately.

Conditions where the Light Sources Used Change Twice

In order for the light sources producing the image to change twice when varying the image-forming angle from −90° to +90° (FIG. 9), the interval L, the distance x and the refractive index n must satisfy:

$$90-\arctan(x/2L)\leq W$$

and $$90-\arctan(x/L)\leq W$$

In the above formula, 90−arctan(x/2L) represents the angle in the direction from the third light source 2C to the first optical-path deflectors 21. 90−arctan(x/L) represents the angle in the direction from the second light source 2B to the first optical-path deflectors 21. W represents the angle of the spread of light from the third light source 2C and the second light source 2B. That is, the above two formulas respectively indicate that the first optical-path deflectors 21 is within the range of the light spreading from the third light source 2C, and that the first optical-path deflectors 21 are within the range of the light spreading from the second light source 2B. W may be, for example, arcsin (1/n).

When the above formulas are satisfied, the light from any of the first light source 2A to the third light source 2C forms an image depending on the image-forming angle. That is, when varying the image-forming angle from −90° to +90°, the light sources of the light forming an image change twice.

FIG. 11 illustrates the first light source 2A, and the second light source 2B and the third light source 2C, arranged on the left side of the first light source 2A. In this case, the stereoscopic image I is mainly formed in the positive angle range. However, the present embodiment may have another light source arranged on the right side of the first light source 2A. This can widen the negative angle range in which the stereoscopic image I is formed.

Further, in the example shown in FIG. 11, the first angle range A1 may include the reference plane S (FIG. 10), and the second angle range A2 and the third angle range A3 may be on the same side with respect to the first angle range A1. In this case, when the image-forming angle is changed from directly in front of the light guide plate 10 to the direction of the second angle range A2 and the third angle range A3, the light sources that form a stereoscopic image change twice while the image-forming angle changes by 90°. With the light sources changing frequently in this way, it is possible to further prevent deterioration in the visibility of the stereoscopic image.

Further, in the example shown in FIG. 11, the first optical-path deflectors 21 may be, for example, the optical-path deflectors farthest away from the incidence surface 11 among those included in the group of optical-path deflectors 20. In other words, the distance x may be the distance between the incidence surface 11 and the optical-path deflector farthest therefrom included in the group of optical-path deflectors 20.

In this case, taking an angle between the first light source 2A and the second light source 2B viewed from the optical-path deflectors as an inter-light-source angle, the first optical-path deflectors 21 have the smallest inter-light-source angle among the optical-path deflectors included in the group of optical-path deflectors 20. Therefore, the first optical-path deflectors 21 have the strictest conditions for the interval L in the above formulas for forming an image in a first angle range A1 and a second angle range A2 that do not overlap each other. Accordingly, when the first optical-path deflectors 21 satisfy the conditions, all the optical-path deflectors included in the group of optical-path deflectors 20 can form an image in a first angle range A1 and a second angle range A2 that do not overlap each other.

Further, in the example shown in FIG. 11, the first optical-path deflectors 21 may be optical-path deflectors positioned at a mid-point between the optical-path deflectors closest to, and the optical-path deflectors farthest from, the incidence surface 11, among the optical-path deflectors included in the group of optical-path deflectors 20. In other words, the distance x may be the distance between the incidence surface 11 and said mid-point.

When the light guide plate 10 is configured to form images both in front of and behind the light guide plate when viewed from the emission surface 12 side of the light guide plate 10, the optical-path deflectors farthest from the incidence surface 11 are optical-path deflectors that form an image behind the light guide plate 10 from the perspective of the emission surface 12. On the other hand, the optical-path deflectors closest to the incidence surface 11 are optical-path deflectors that form an image in front of the light guide plate 10 from the perspective of the emission surface 12. Therefore, when the optical-path deflectors located at the mid-point of these optical-path deflectors satisfy the above-described conditions for L, the images formed behind and in front of the light guide plate from the perspective of the emission surface 12 can both be formed in the first angle range A1 and the second angle range A2.

There may not necessarily be optical-path deflectors at the mid-point in the group of optical-path deflectors. However, even if there are no optical-path deflectors at the mid-point, both images formed behind and in front of the light guide plate when viewed from the emission surface 12 side can be formed in the first angle range A1 and the second angle range A2 as long as the interval L satisfies the above formulas with respect to the distance x to the mid-point.

Effect

As described above, according to the optical device 1A of the present embodiment, the light sources for the light forming the stereoscopic image change depending on the image-forming angle. Therefore, the stereoscopic image can be perceived from a wide angle range including the first angle range A1, the second angle range A2, and the third angle range A3. Accordingly, it is possible to limit blurring from occurring in an image formed in a range of image-forming angles with large absolute values.

In particular, when the optical device 1A is used in a vehicle lamp like the vehicle lamp 100, it is legally required that an image formed by the optical device 1A can be perceived when the image-forming angle is 80°. The optical device 1A is capable of satisfying the above legal requirement.

In the optical device 1A of the present embodiment, moreover, the three light sources can form images in space within angular ranges which are separate from or adjoining each other. Therefore, the images formed can be perceived from a wide angle range.

§ 3 MODIFIED EXAMPLES

First Modified Example

Figure 15:
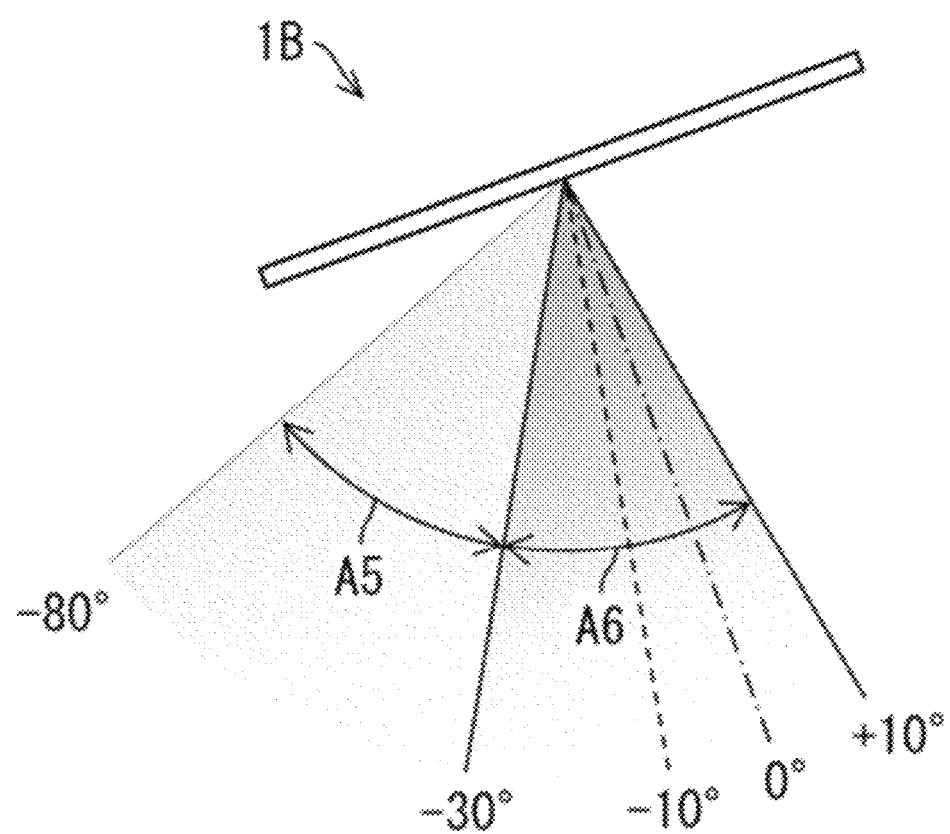
FIG. 15 is a diagram showing a relationship between an image-forming angle and a light source in an optical device according to a first modified example of the present invention.

FIG. 15 is a diagram showing a relationship between an image-forming angle and a light source in an optical device 1B according to a first modified example of the present invention. The values of the above-described interval L and distance x are different for the optical device 1B from the values for the optical device 1A. In the optical device 1B, light from different light sources forms a stereoscopic image I in a second angle range A6, where the image-forming angle has small absolute values, and in a first angle range A5, with angles less than the angles in the second angle range A6. On the other hand, no stereoscopic image I is formed if the image-forming angle is larger than the second angle range A6. In this case, when the image-forming angle varies from −90° to +90°, the light sources used to produce the stereoscopic image I change only once when the image-forming angle shifts from the first angle range A5 to the second angle range A6. The first angle range A5 may be, for example, a range of equal to or greater than −80° and equal to or less than −30°. The second angle range A6 may be, for example, a range of greater than −30° and equal to or less than +10°.

In order for the light sources used to produce the image to change once when varying the image-forming angle from −90° to +90° (FIG. 15), the interval L, the distance x and the refractive index n must satisfy:

$$90 - \arctan(x/2L) > W$$

and $$90 - \arctan(x/L) \leq W$$

These formulas indicate respectively that the first optical-path deflectors 21 are not within the range of the spread of light from the third light source 2C, and that the first optical-path deflectors 21 are within the range of the spread of light from the second light source 2B.

When the above formulas are satisfied, the light from either the first light source 2A or the second light source 2B forms an image depending on the image-forming angle. That is, when varying the image-forming angle from −90° to +90°, the light sources used to produce an image change once. Therefore, the image formed can be perceived from a wide angular range including the first angle range A5 and the second angle range A6.

Second Modified Example

Figure 16:
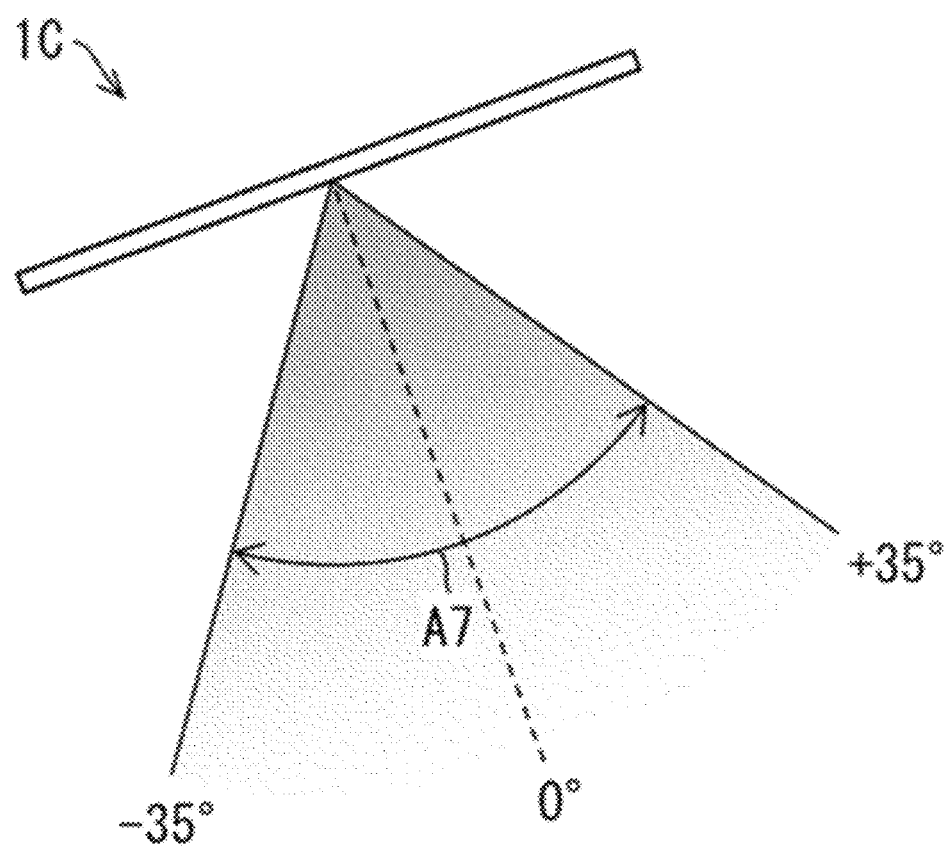
FIG. 16 is a diagram showing a relationship between an image-forming angle and a light source in an optical device according to a second modified example of the present invention.

FIG. 16 is a diagram showing a relationship between an image-forming angle and a light source in an optical device 1C according to a second modified example of the present invention. The values of the above-described interval L and distance x are different for the optical device 1C from the values for the optical devices 1A and 1B. With the optical device 1C, the stereoscopic image I is formed only in the first angle range A7 in which the absolute value of the image-forming angle is small. Here, in the optical device 1C, the first optical-path deflectors 21 (FIGS. 7A and 7B) form the stereoscopic image I1 (first image) in the space by changing the optical path of only the light incident from the first light source 2A on the light guide plate 10. Also, the second optical-path deflectors 22 (FIGS. 7A and 7B) form the stereoscopic image I2 (second image) in the space by changing the optical path of only the light incident from the second light source 2B on the light guide plate 10. In other words, neither the first optical-path deflectors or the second optical-path deflectors deflect light from both the first light source and the second light source; no stereoscopic image I is formed in the space in the ranges of the image-forming angle outside the first angle range A7. The first angle range A7 may be, for example, a range of equal to or greater than −35° and equal to or less than +35°.

In order for the light sources producing the stereoscopic images I to not change when varying the image-forming angle from −90° to +90°, the interval L and the distance x shown in FIG. 11 and the refractive index n must satisfy:

$$90 - \arctan(x/2L) > W$$

and $$90 - \arctan(x/L) > W$$

These formulas indicate respectively that the first optical-path deflectors 21 are not within the range of the spread of light from the third light source 2C, and that the first optical-path deflectors 21 are not within the range of the spread of light from the second light source 2B.

When the above formulas are satisfied, the light from the first light source 2A and the second light source 2B respectively form the stereoscopic image I. That is, when varying the image-forming angle from −90° to +90°, the light sources of light forming the respective stereoscopic image I do not change. Therefore, according to the optical device 1C, even when the first light source and the second light source are turned on at the same time, for example, the images do not overlap each other. This prevents a deterioration in visibility due to a double stereoscopic image I being formed by the light from the first light source 2A and the light from the second light source 2B. That is, even when a plurality of light sources is provided on the same side surface of the light guide plate in order to widen the image formation area, each image formed can be clearly displayed. Further, the stereoscopic images I1 and I2 are repetitions of the same design or mutually similar designs repeated in the direction from the first light source 2A to the second light source 2B. This minimizes the deterioration in visibility due to a double stereoscopic image I being formed by the light from the first light source 2A and the light from the second light source 2B. This improves the visibility of the stereoscopic image I. However, the stereoscopic images I1 and I2 do not necessarily have to be repetitions of the same design or mutually similar designs.

Further, the first optical-path deflectors 21 and the second optical-path deflectors 22 at least partially overlap each other in the direction in which the light incident from the first light source 2A and the second light source 2B is guided. In other words, it is not necessary to arrange the first optical-path deflectors 21 and the second optical-path deflectors 22 so as not to overlap each other in the direction of guided light. This improves the degree of freedom when arranging the first optical-path deflectors 21 and the second optical-path deflectors 22.

Third Modified Example

Figure 18A:
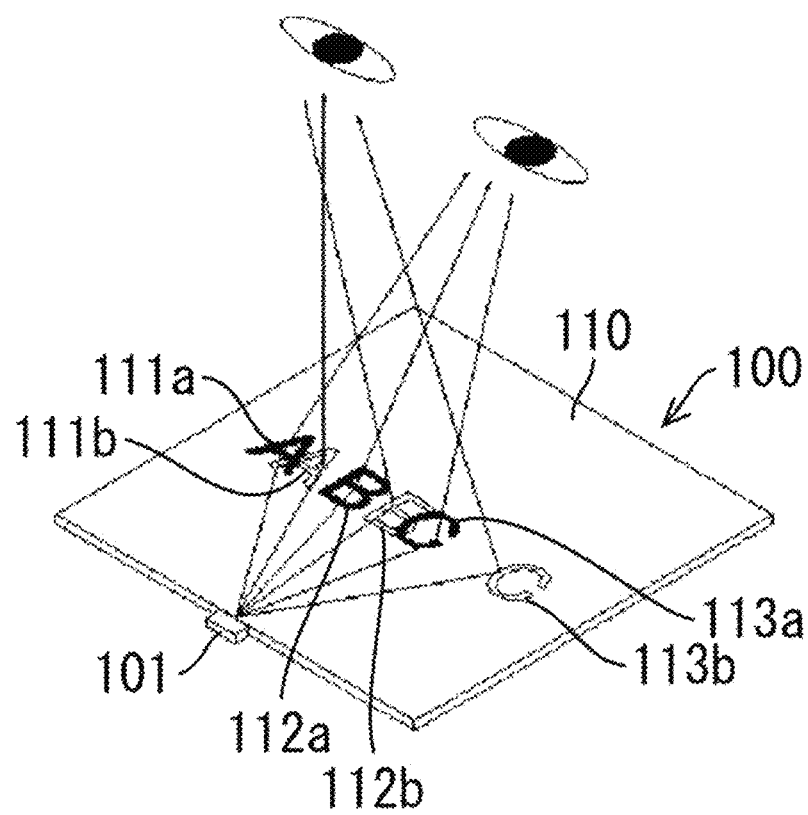
FIGS. 18A through 18C are diagrams illustrating the configurations of an image display device disclosed in the Patent Document 1.
Figure 18B:
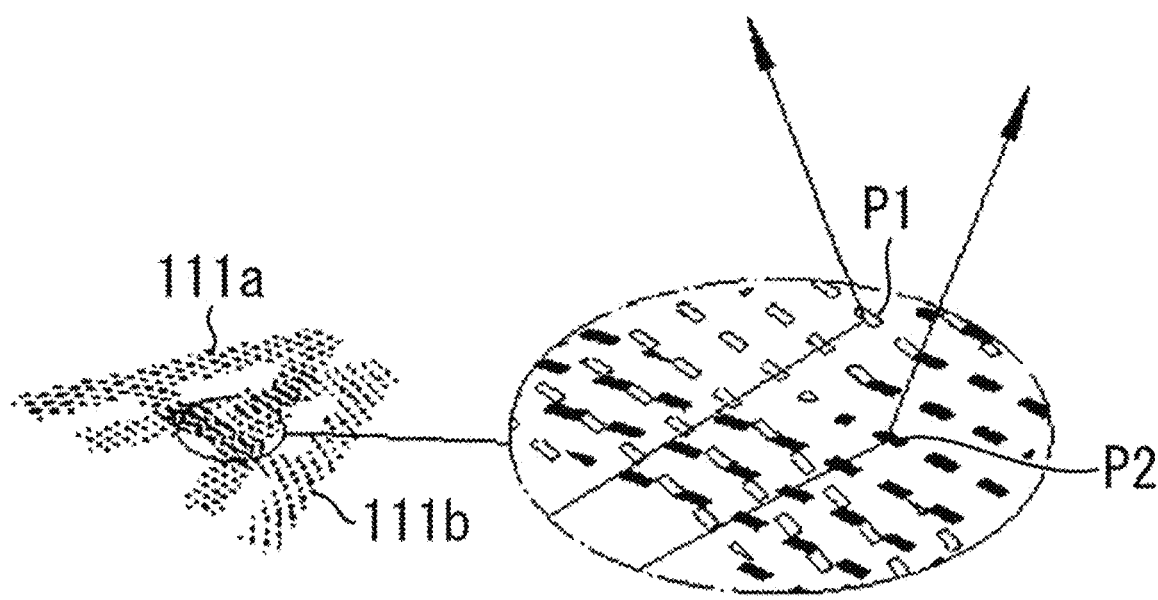
Figure 18C:
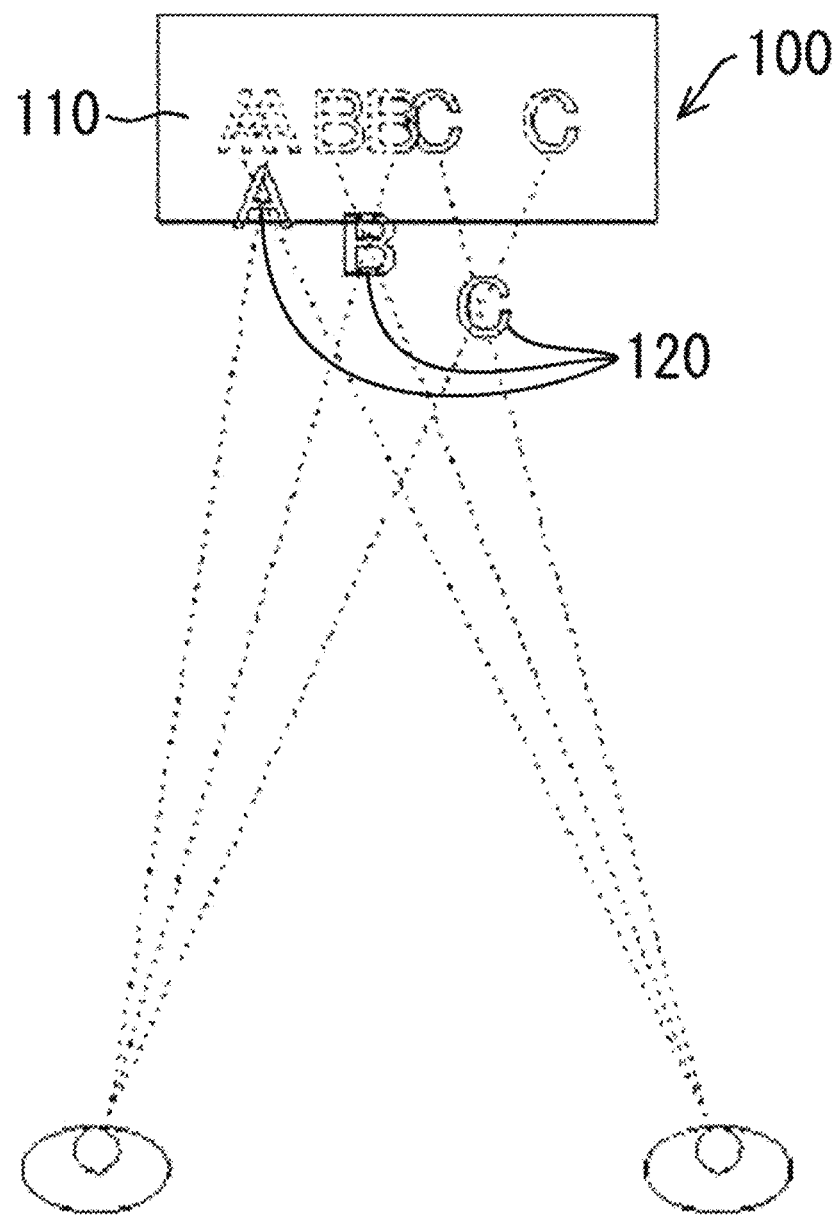
Figure 19A:
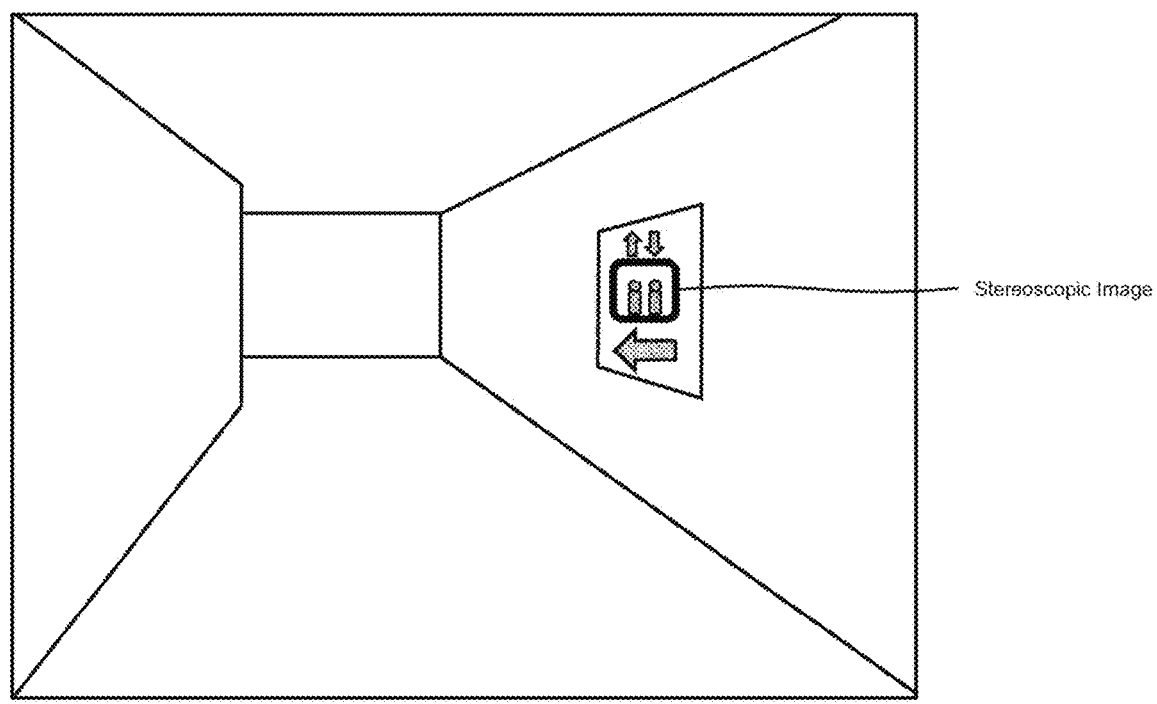
FIG. 19A is a perspective view illustrating a stereoscopic image formed emerging sideways from a wall along a corridor.
Figure 19B:
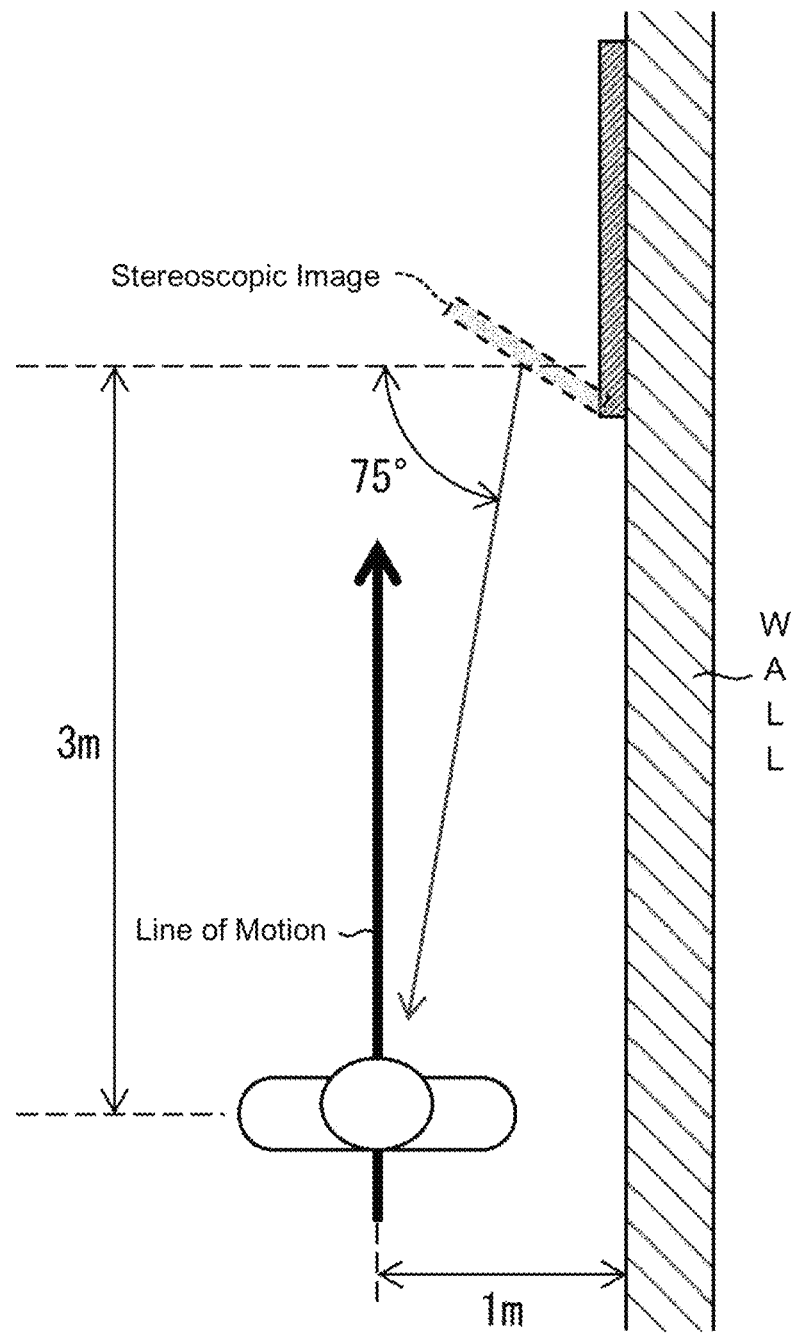
FIG. 19B is a plan view illustrating the relationship between the stereoscopic image and an observer viewing said stereoscopic image.
Figure 20A:
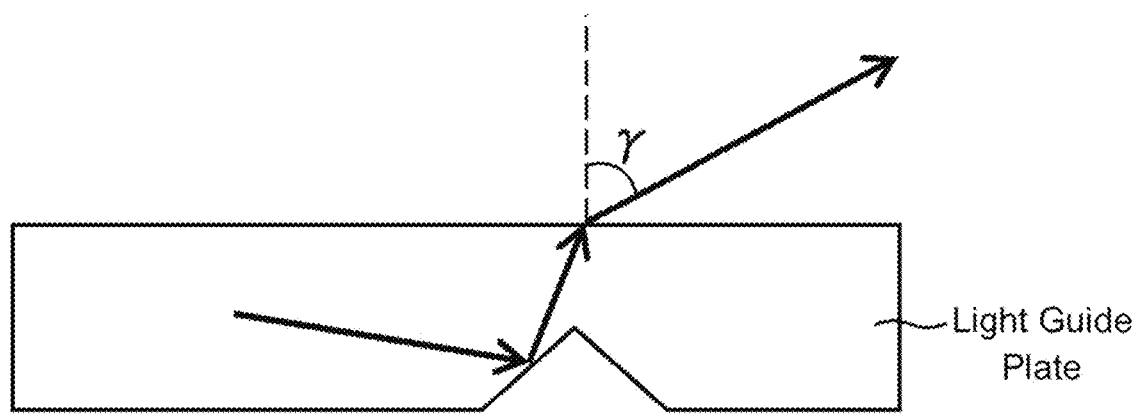
FIGS. 20A and 20B are for describing the first reason the visibility of a stereoscopic image degrades in a wide viewing angle area.
Figure 20B:
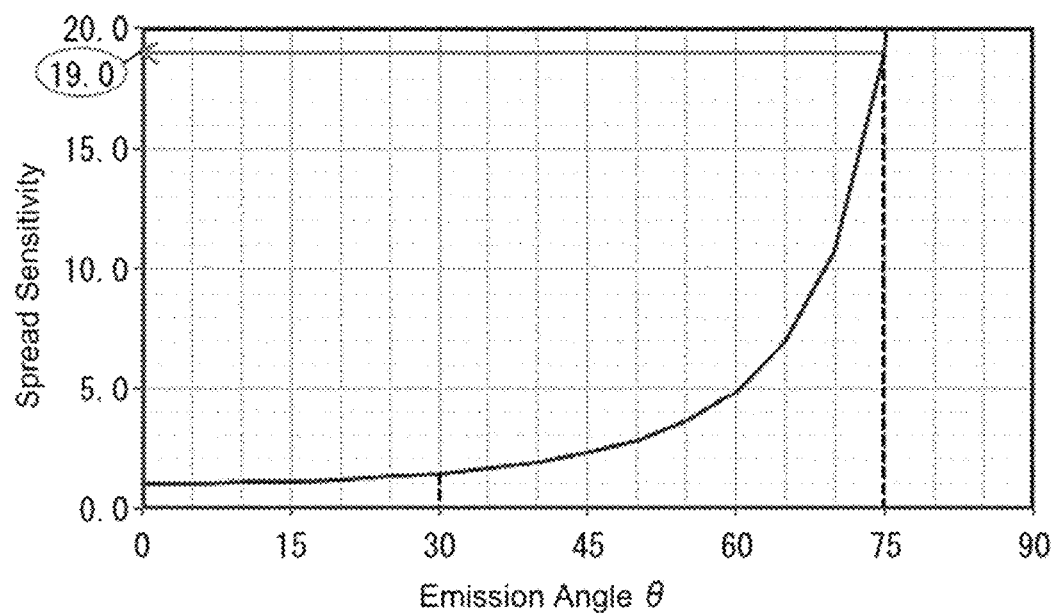
Figure 20B:
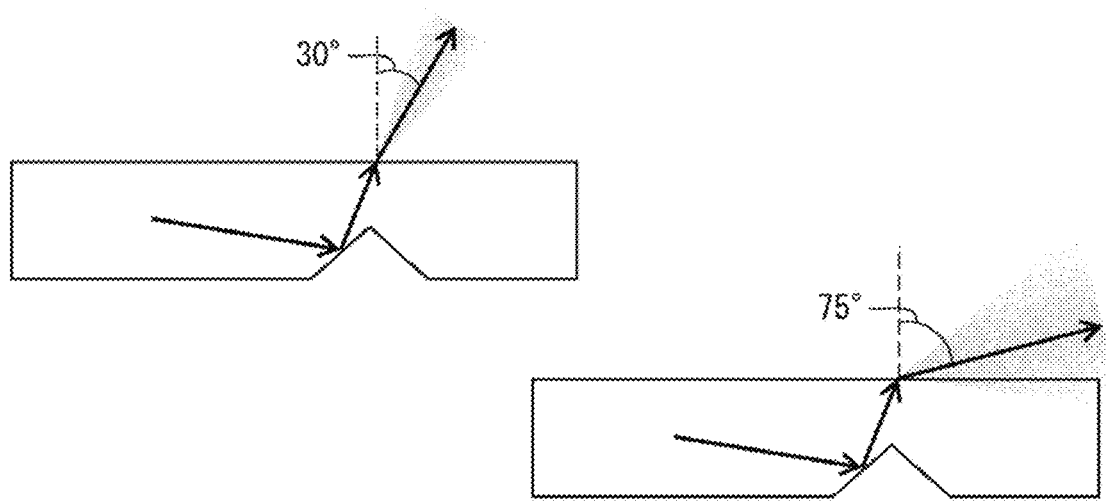
Figure 21:
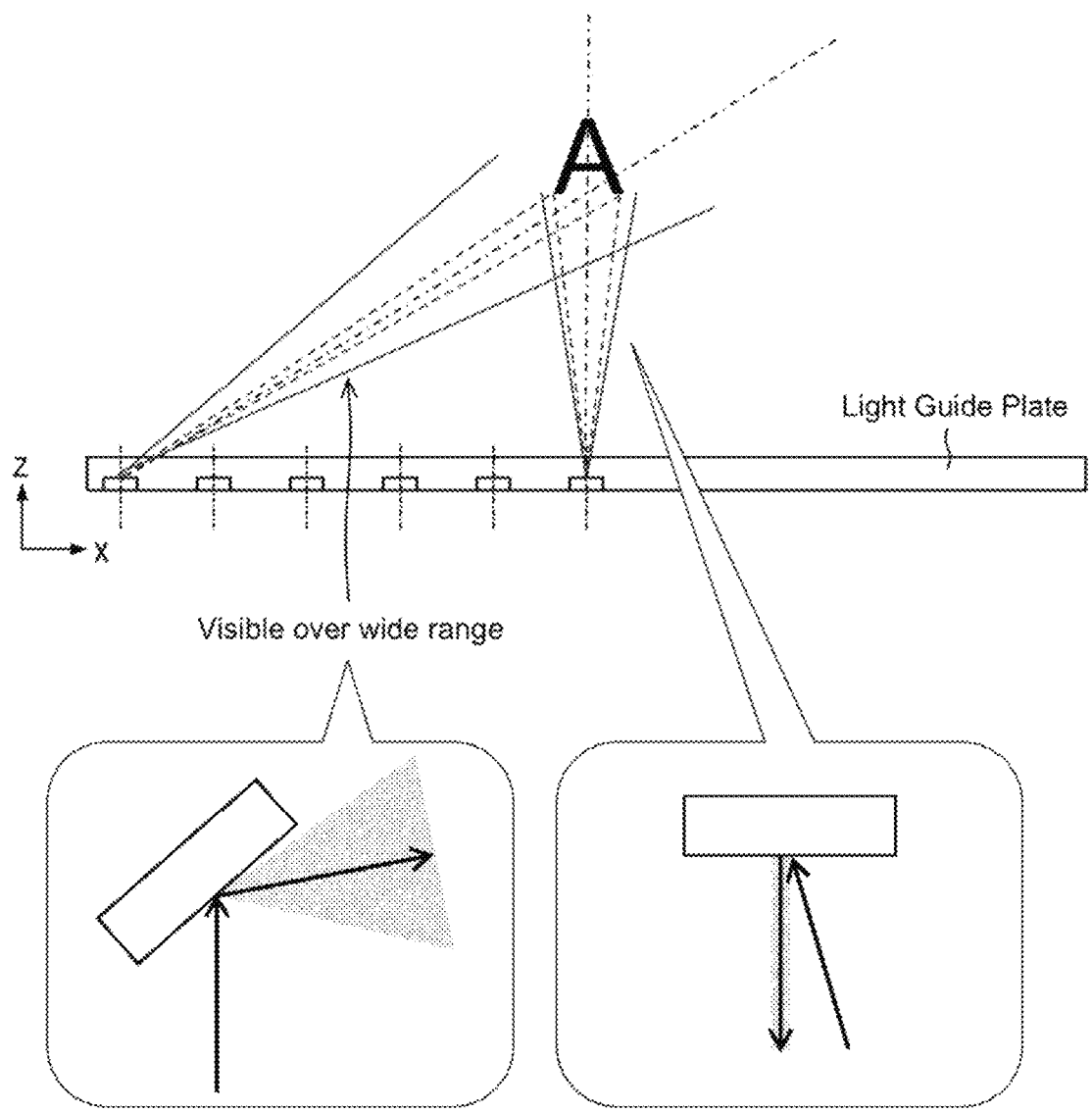
FIG. 21 is for describing the second reason the visibility of a stereoscopic image degrades in a wide viewing angle area.

In a light guide plate according to an embodiment of the present invention, a group of optical-path deflectors 20 may include right-eye display patterns and left-eye display patterns similar to right-eye display patterns 111b, 112b, 113b and left-eye display patterns 111a, 112a, 113a shown in FIG. 18. The right-eye display patterns create a right-eye image, and the left-eye display patterns create a left-eye image. In this configuration, the stereoscopic images I1 to I4 formed by the first optical-path deflectors 21 to the fourth optical-path deflectors 24 can have a stereoscopic effect.

Fourth Modified Example

Figure 17A:
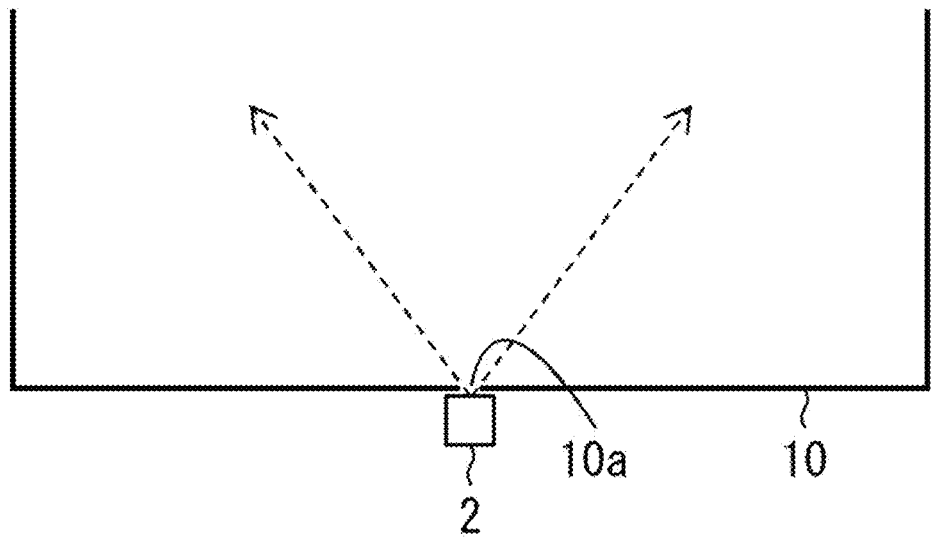
FIGS. 17A and 17B are diagrams for describing a fourth modified example of the present invention.
Figure 17B:
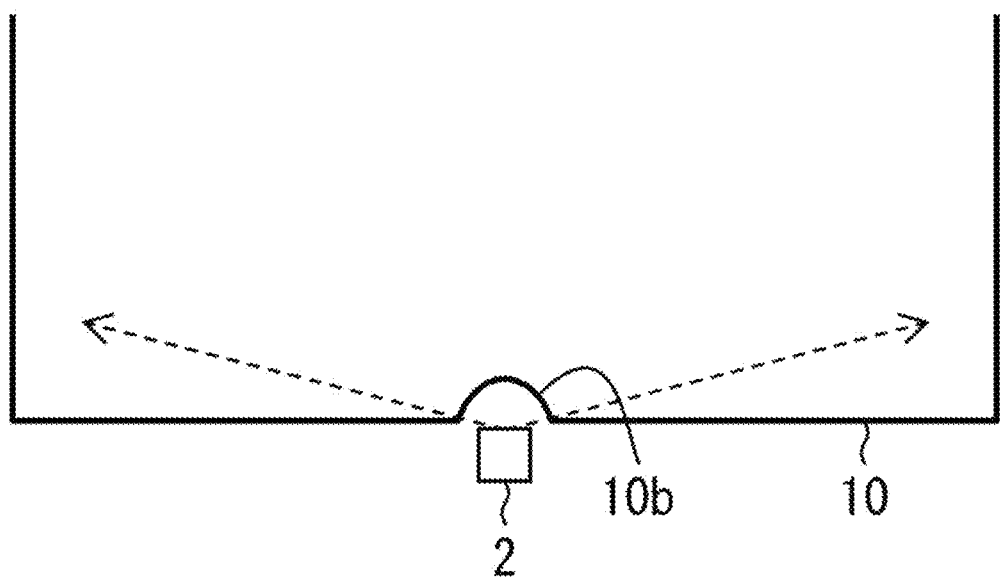

FIGS. 17A and 17B are diagrams for describing a fourth modified example of the present invention. Note that, in FIGS. 17A and 17B, only one light source 2 is shown for simplicity.

In the example shown in FIG. 17A, the light emitted by the light source 2 enters the light guide plate 10 through a slit 10a. This configuration reduces the spread of light in the light guide plate 10. Further, in the example shown in FIG. 17B, the light emitted from the light source 2 enters the light guide plate 10 through a recess 10b formed on a surface of the light guide plate 10. This configuration increases the spread of light in the light guide plate 10.

As described above, the light guide plate 10 according to the present modified example can change the spread of incident light from the light source 2 by having the slit 10a or the recess 10b. Also, a similar effect is obtained when a lens or the like is provided between the light source 2 and the light guide plate 10.

In particular, it is possible to increase the number of light sources which provide the light entering the respective optical-path deflectors by increasing the spread of the incident light from the light source 2. This in turn allows the light source to change more times to produce an image in accordance with varying the image forming angle, further improving the visibility of the image.

The present invention is not limited to the above-described embodiments, and various modifications can be made within the scope of the claims, and the embodiments obtained by appropriately combining the technical means disclosed in the different embodiments are also included in the technical scope of the present invention.

Overview

As described above, a light guide plate according to one embodiment of the present invention is configured to guide light incident thereon, change the optical path of the guided light, and emit said light from an emission surface thereof, and thereby form an image in a space; the light guide place including: a group of optical-path deflectors that change the optical path of the light, the group of optical-path deflectors deflecting the light incident on the light guide plate from a first light source arranged at a predetermined position to form an image in the space within a predetermined first angle range with respect to a reference plane that is orthogonal to the emission surface and parallel to a side surface of the light guide plate, and deflecting the light incident on the light guide plate from a second light source arranged at a position away from the position of the first light source to form an image in a space within a predetermined second angle range with respect to the reference plane, wherein the first angle range and the second angle range are separate from each other or are adjoining each other.

According to the above-described configuration, the light guide plate causes light incident thereon from the first light source and the second light source to be emitted from the emission surface thereof. Light incident on the light guide plate from the first light source forms an image in a space within a predetermined first angle range with respect to a reference plane that is orthogonal to the emission surface and is parallel to a side surface of the light guide plate. Further, the light incident on the light guide plate from the second light source forms an image in a space within a predetermined second angle range with respect to the reference plane. The first angle range and the second angle range are separate from each other or adjoining each other. Therefore, the user can perceive the image formed in both the first angle range and the second angle range. It is thus possible to minimize the deterioration in the visibility of a stereoscopic image in a space within a wide viewing angle area.

The light guide plate according to an embodiment of the present invention satisfies $$90-\arctan(x/2L)>W$$

and $$90-\arctan(x/L) \leq W$$

where L is an interval between the first light source and the second light source, x is a distance between the incidence surface and the optical-path deflectors, n is a refractive index of the light guide plate and W is a spread angle of the light from the first light source and the second light source.

According to the above configuration, when varying the image-forming angle of the image with respect to the reference plane from −90° to +90°, the light sources projecting the image formed in the space change.

Further, in the light guide plate according to an embodiment of the present invention, x is the distance between the incidence surface and an optical-path deflector that is farthest therefrom in the group of optical-path deflectors.

An optical-path deflector that is farthest from the incidence surface must satisfy stricter conditions than any other optical-path deflectors for forming an image in the first angle range and the second angle range. Therefore, according to the above configuration, all the optical-path deflectors included in the group of optical-path deflectors can form an image in a first angle range and a second angle range that do not overlap each other.

Further, in the light guide plate according to an embodiment of the present invention, x is the distance between the incidence surface and a mid-point within the group of optical-path deflectors, and the mid-point is between an optical-path deflector that is located nearest to the incidence surface and an optical-path deflector that is located farthest from the incidence surface in the group of optical-path deflectors.

When the light guide plate is configured to form images on both behind and in front of the light guide plate when viewed from the emission surface side, the optical-path deflectors farthest from the incidence surface are the optical-path deflectors that form an image beyond the light guide plate when viewed from the emission surface side. On the other hand, the optical-path deflectors closest to the incidence surface are the optical-path deflectors that form an image more in front of the light guide plate when viewed from the emission surface side. Therefore, according to the above configuration, both the image formed behind the light guide plate and the image formed in front of the light guide plate when viewed from the emission surface side can be formed in the first angle range and the second angle range.

Further, the light guide plate according to an embodiment of the present invention is configured to change the optical path of the light incident on the light guide plate from a third light source arranged at a position away from the positions of the first and second light source, to form an image in a space within a predetermined third angle range with respect to the reference plane, wherein the first angle range, the second angle range and the third angle range are separate from each other or adjoining each other.

According to the above configuration, the light incident on the light guide plate from the third light source forms an image in the space within the third angle range which is separate from or adjoining the first angle range and the second angle range. Therefore, the user can perceive the image formed in all the first angle range, the second angle range, and the third angle range. It is thus possible to further minimize the deterioration in the visibility of the stereoscopic image in a space within a wide viewing angle area.

Further, in the light guide plate according to an embodiment of the present invention, the first angle range includes the reference plane, and the second angle range and the third angle range are on the same side with respect to the first angle range.

According to the aforementioned configuration, when varying the image-forming angle from directly in front of the light guide plate to the direction of the second angle range and the third angle range, the light sources for producing a stereoscopic image change twice while the image-forming angle changes by 90°. With the light sources changing frequently in this way, it is possible to further minimize the deterioration in the visibility of the stereoscopic image.

The light guide plate according to an embodiment of the present invention satisfies:

$$90 - \arctan(x/2L) \le W$$

and $$90 - \arctan(x/L) \le W$$

where L is an interval between the first light source and the second light source and between the second light source and the third light source, x is the distance between the incidence surface and the optical-path deflectors, n is the refractive index of the light guide plate and W is a spread angle of the light from the first light source and the second light source.

According to the above configuration, when varying the image-forming angle of the image with respect to the reference plane from −90° to +90°, the light sources projecting the image formed in the space change twice.

Further, a light guide plate according to an embodiment of the present invention is configured to guide light incident thereon, change the optical path of the guided light and emit said light from an emission surface thereof to form an image in a space; the light guide plate includes first optical-path deflectors and second optical-path deflectors for changing the optical path of the light, and the first optical-path deflectors change the optical path of only the light incident on the light guide plate from the first light source arranged at a predetermined position to form a first image in a space, the second optical-path deflectors change the optical path of only the light incident on the light guide plate from a second light source arranged at a position away from the position of the first light source to form a second image in a space, and the first optical-path deflectors and the second optical-path deflectors at least partially overlap with each other in a direction in which the light incident from the first light source and the second light source is guided.

According to the above configuration, the first optical-path deflectors change the optical path of only the light from the first light source to form a first image in the space. Further, the second optical-path deflectors change the optical path of only the light from the second light source to form a second image in the space. In other words, neither the first optical-path deflectors nor the second optical-path deflectors deflect light from both the first light source and the second light source. Therefore, for example, even when the first light source and the second light source are turned on at the same time, the images do not overlap each other, so that the visibility of the first image and the second image improves. That is, even when a plurality of light sources is provided on the same side surface of the light guide plate in order to widen the image formation area, each image formed can be displayed clearly. Further, at this time, the first optical-path deflectors and the second optical-path deflectors at least partially overlap each other in the direction in which the light incident from the first light source and the second light source is guided. This improves the degree of freedom in arranging the first optical-path deflectors and the second optical-path deflectors.

The light guide plate according to an embodiment of the present invention satisfies:

$$90 - \arctan(x/2L) > W$$

and $$90 - \arctan(x/L) > W$$

where L is an interval between the first light source and the second light source, x is a distance between the incidence surface through which the light enters the light guide plate and the first optical-path deflectors and the second optical-path deflectors, n is the refractive index of the light guide plate and W is a spread angle of the light from the first light source and the second light source.

According to the above configuration, when varying the image-forming angle of the image with respect to the reference plane from −90° to +90°, the light sources projecting the image formed in the space do not change.

Further, in the light guide plate according to an embodiment of the present invention, the group of optical-path deflectors includes right-eye display patterns and left-eye display patterns, where the right-eye display patterns form a right-eye image, and the left-eye display patterns form a left-eye image.

The above-described configuration can form a stereoscopic image.

Furthermore, in a light guide plate according to an embodiment of the present invention, said images are images of the same or mutually similar designs repeated away from each other in the direction from the first light source to the second light source.

According to the above-described configuration, it is unlikely for users to recognize any switching of light sources used for projecting the image. This improves the visibility of the image.

A vehicle lamp according to an embodiment of the present invention includes a light guide plate according to any of the above-described embodiments.

REFERENCE NUMERALS 1A, 1B, 1C Optical device
2 Light source
2A First light source
2B Second light source
2C Third light source
10 Light guide plate
20 Group of optical-path deflectors
21 First optical-path deflectors
22 Second optical-path deflectors
AA, A1, A5 First angle range
AB, A2, A6 Second angle range
A3 Third angle range
100 Vehicle lamp

The invention claimed is:

1. A light guide plate positioned in an xy plane and configured to guide light incident on an incidence surface of the light guide plate, change the optical path of the light, and emit the light from an emission surface to form an image in a space outside the light guide plate within a predetermined first angle range and a predetermined second angle range from a reference plane orthogonal to the xy plane, the light guide plate comprising a group of optical-path deflectors that change the optical path of the light, wherein the group of optical-path deflectors:

deflects the light incident on the light guide plate from a first light source arranged at a predetermined position to form a first stereoscopic image in the space within the predetermined first angle range with respect to the reference plane that is orthogonal to the emission surface and parallel to a side surface of the light guide plate; and deflects the light incident on the light guide plate from a second light source arranged at a position away from the position of the first light source, to form a second stereoscopic image in the space within the predetermined second angle range with respect to the reference plane, the first angle range and the second angle range are separate from each other or adjoining each other, the group of optical-path deflectors are arranged such that the first stereoscopic image and the second stereoscopic image in the space appear the same or mutually similar when viewed from the first angle range and the second angle range, and the first stereoscopic image is formed in the space within the predetermined first angle range by the first light source; and the second stereoscopic image is formed in the space within the predetermined second angle range by the second light source, such that for set values of x, L, and W the light guide plate satisfies the system of inequalities expressed by:

$$90°-\arctan(x/2L) > W;$$

and $$90°-\arctan(x/L) \leq W,$$

where L is an interval between the first light source and the second light source, x comprises a distance between the incidence surface, through which the light enters the light guide plate, and the group of optical-path deflectors, and W is the spread angle of the light from the first light source and the second light source.

2. The light guide plate according to claim 1, wherein x comprises a distance between the incidence surface and an optical-path deflector farthest therefrom in the group of optical-path deflectors.

3. The light guide plate according to claim 2, wherein the image comprises a right-eye image and a left-eye image;

the group of optical-path deflectors comprises right-eye display patterns and left-eye display patterns; and the right-eye display patterns form a right-eye image, and the left-eye display patterns form a left-eye image.

4. A vehicle lamp comprising the light guide plate according to claim 2.

5. The light guide plate according to claim 1, wherein x comprises a distance between the incidence surface and a mid-point in the group of optical-path deflectors, and the mid-point is between an optical-path deflector that is located nearest to the incidence surface and an optical-path deflector that is located farthest from the incidence surface in the group of optical-path deflectors.

6. The light guide plate according to claim 1, wherein the group of optical-path deflectors changes the optical path of the light incident on the light guide plate from a third light source arranged at a position away from the positions of the first and second light sources to form a third stereoscopic image in the space within a predetermined third angle range with respect to the reference plane; and the first angle range, the second angle range, and the third angle range are separate from each other or adjoining each other.

7. The light guide plate according to claim 6, wherein the reference plane extends within the first angle range; and the second angle range and the third angle range are on the same side with respect to the first angle range.

8. The light guide plate according to claim 7, wherein the first stereoscopic image in the space is formed within the predetermined first angle range by the first light source; the second stereoscopic image in the space is formed within the predetermined second angle range by the second light source; and the third stereoscopic image in the space is formed within the predetermined third angle range by the third light source, such that for set values of x, L, and W the light guide plate satisfies a system of inequalities expressed by:

$$90°-\arctan(x/2L) \leq W$$

and $$90°-\arctan(x/L) \leq W,$$

where L is an interval between the first light source and the second light source and between the second light source and the third light source, x comprises a distance between the incidence surface and the group of optical-path deflectors and W is the spread angle of the light from the first light source, the second light source, and the third light source.

9. The light guide plate according to claim 6, wherein the first stereoscopic image is formed in the space within the predetermined first angle range by the first light source; the second stereoscopic image is formed within the predetermined second angle range by the second light source; and the third stereoscopic image is formed within the predetermined third angle range by the third light source such that for set values of x, L, and W, the light guide plate satisfies a system of inequalities expressed by:

$$90°-\arctan(x/2L) \leq W$$

and $$90°-\arctan(x/L) \leq W,$$

where L is an interval between the first light source and the second light source and between the second light source and the third light source, x comprises a distance between the incidence surface and a point in the group of optical-path deflectors, and W is the spread angle of the light from the first light source, the second light source, and the third light source.

10. The light guide plate according to claim 1, wherein the image comprises a right-eye image and a left-eye image;

the group of optical-path deflectors comprises right-eye display patterns and left-eye display patterns; and the right-eye display patterns form the right-eye image, and the left-eye display patterns form the left-eye image.

11. A vehicle lamp comprising the light guide plate according to claim 1.

12. The light guide plate according to claim 1, wherein the image comprises a right-eye image and a left-eye image;

the group of optical-path deflectors comprises right-eye display patterns and left-eye display patterns; and the right-eye display patterns form the right-eye image, and the left-eye display patterns form the left-eye image.

13. The light guide plate according to claim 1, wherein the image comprises a repetition of the same or mutually similar designs repeated away from each other in a direction from the first light source toward the second light source.

14. A vehicle lamp comprising the light guide plate according to claim 2.

15. A light guide plate positioned in an xy plane and configured to guide light incident on an incidence surface of the light guide plate, change the optical path of the light, and emit the light from an emission surface to form an image comprising a first stereoscopic image and a second stereoscopic image in a space outside the light guide plate within a predetermined first angle range and a predetermined second angle range from a reference plane orthogonal to the xy plane, the light guide plate comprising first optical-path deflectors and second optical-path deflectors comprising a group of optical-path deflectors that change the optical path of the light, wherein:

the first optical-path deflectors change the optical path of only the light incident on the light guide plate from a first light source arranged at a predetermined first position to form the first stereoscopic image in the space outside the light guide plate within the predetermined first angle range;

the second optical-path deflectors change the optical path of only the light incident on the light guide plate from a second light source arranged at a second position away from the first position, to form the second stereoscopic image in the space outside the light guide plate within the predetermined second angle range; and the first optical-path deflectors and the second optical-path deflectors at least partially overlap with each other in a direction in which light incident from the first light source and the second light source is guided;

the first optical-path deflectors and the second optical-path deflectors are arranged such that the first stereoscopic image and the second stereoscopic image in the space appear the same or mutually similar when viewed from within the predetermined first angle range and the predetermined second angle range, and the first stereoscopic image is formed in the space within the predetermined first angle range by the first light source and the second stereoscopic image is formed in the space within the predetermined second angle range by the second light source such that for set values of x, L, and W the light guide plate satisfies a system of inequalities expressed by:

$$90° - \arctan(x/2L) > W;$$

and $$90° - \arctan(x/L) > W,$$

where L is an interval between the first light source and the second light source, x comprises a distance between a point on the incidence surface, through which the light enters the light guide plate, and the first and second optical-path deflectors, and W is the spread angle of the light from the first light source and the second light source.

* * * * *